Figure 1:
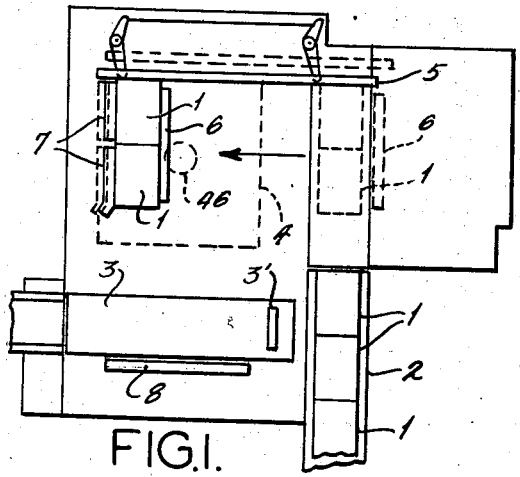

April 21, 1959 W. BOEHL ET AL 2,883,074
PALLET LOADING MACHINE
Filed Oct. 4, 1951 31 Sheets-Sheet 1

INVENTORS:
WILHELM BOEHL
ROY R. WORRALL
JOHN M. ALVEY JR.
By Carr & Carr & Gravely
ATTORNEYS.

April 21, 1959

W. BOEHL ET AL 2,883,074

PALLET LOADING MACHINE

Filed Oct. 4, 1951

31 Sheets-Sheet 2

INVENTORS:
WILHELM BOEHL
ROY R. WORRALL
JOHN M. ALVEY JR.

By Carr & Carr & Gravely
ATTORNEYS.

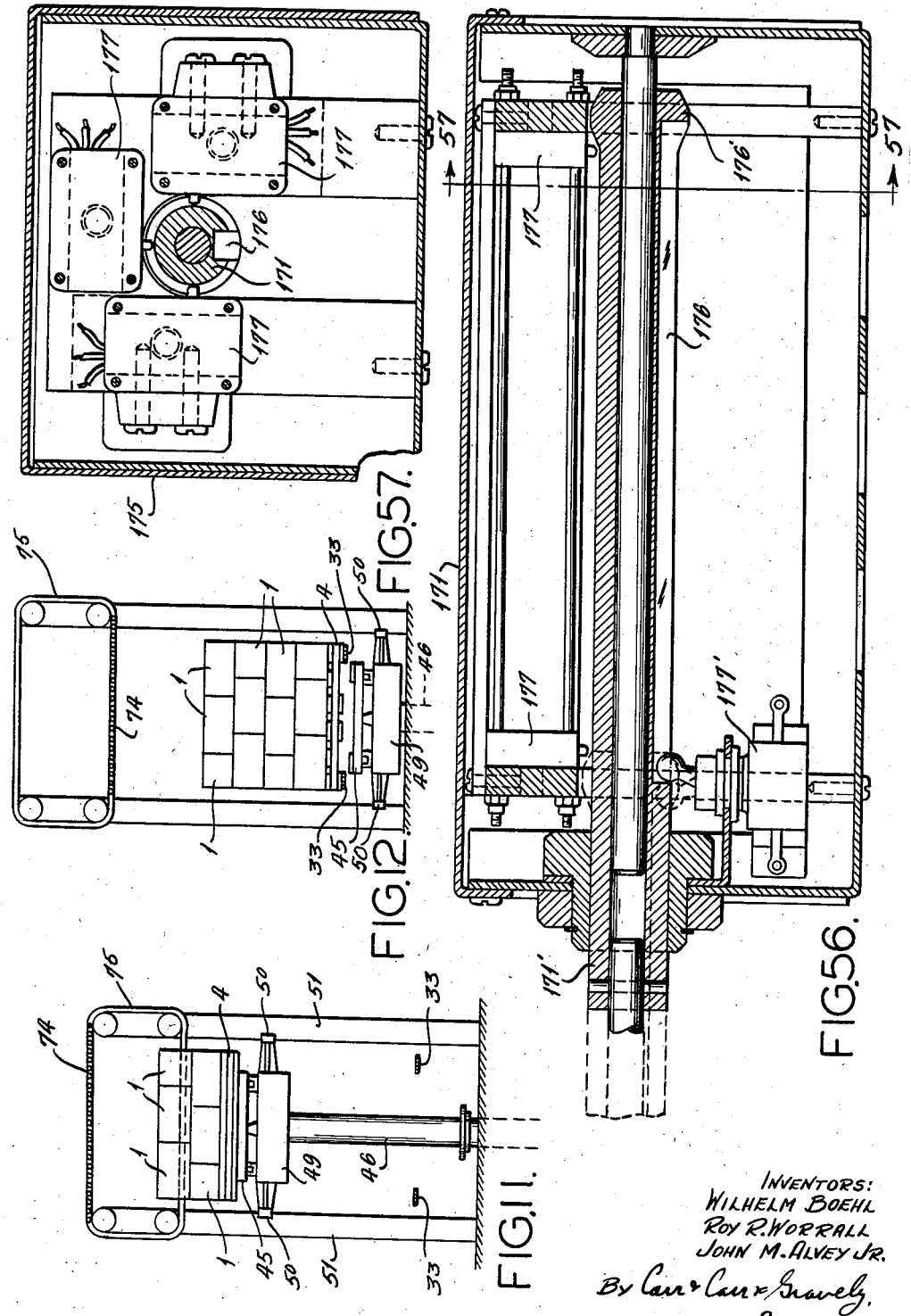

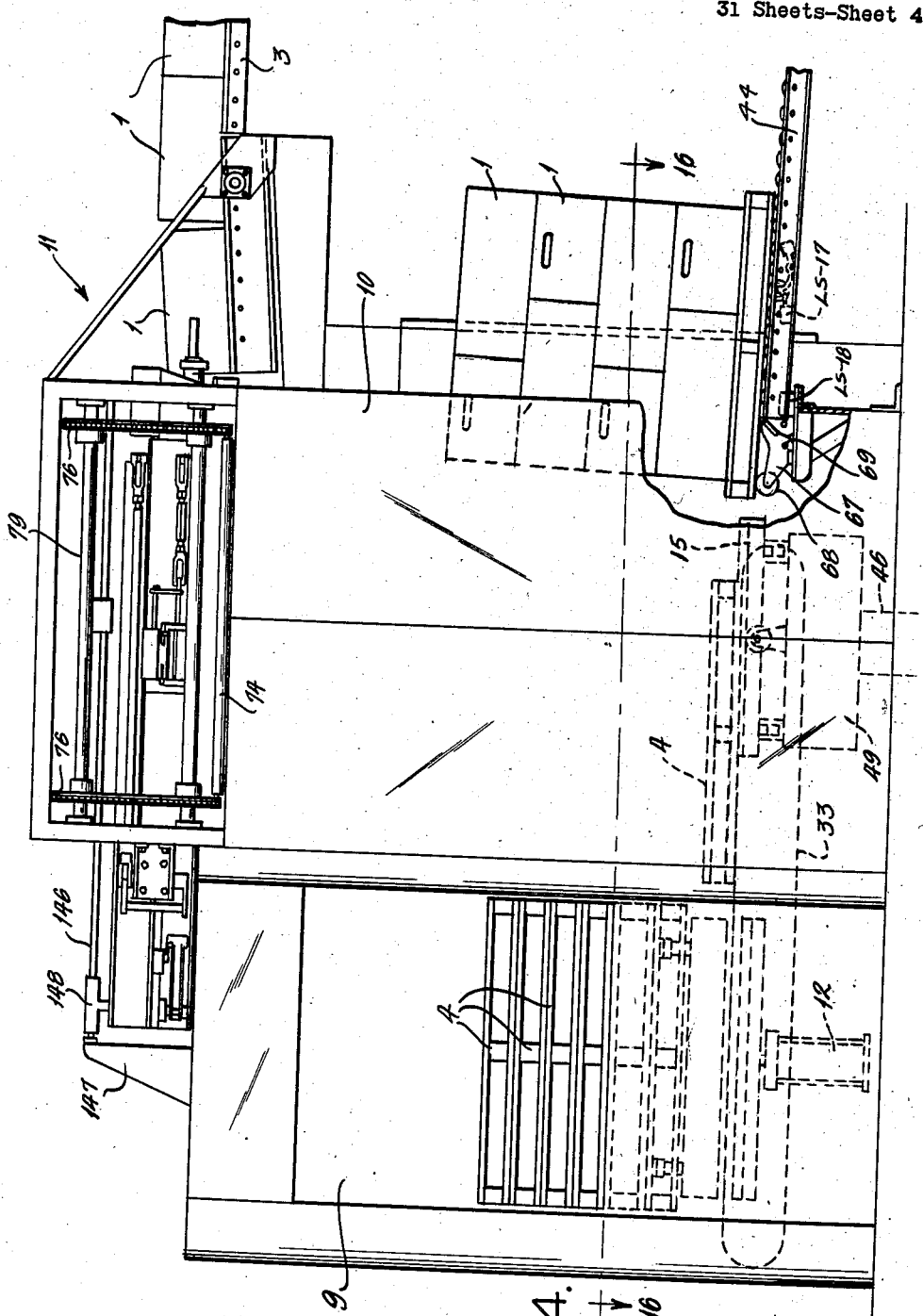

April 21, 1959 W. BOEHL ET AL 2,883,074
PALLET LOADING MACHINE
Filed Oct. 4, 1951 31 Sheets-Sheet 9

INVENTORS:
WILHELM BOEHL
ROY R. WORRALL
JOHN M. ALVEY JR.
By Carr & Carr & Gravely
ATTORNEYS.

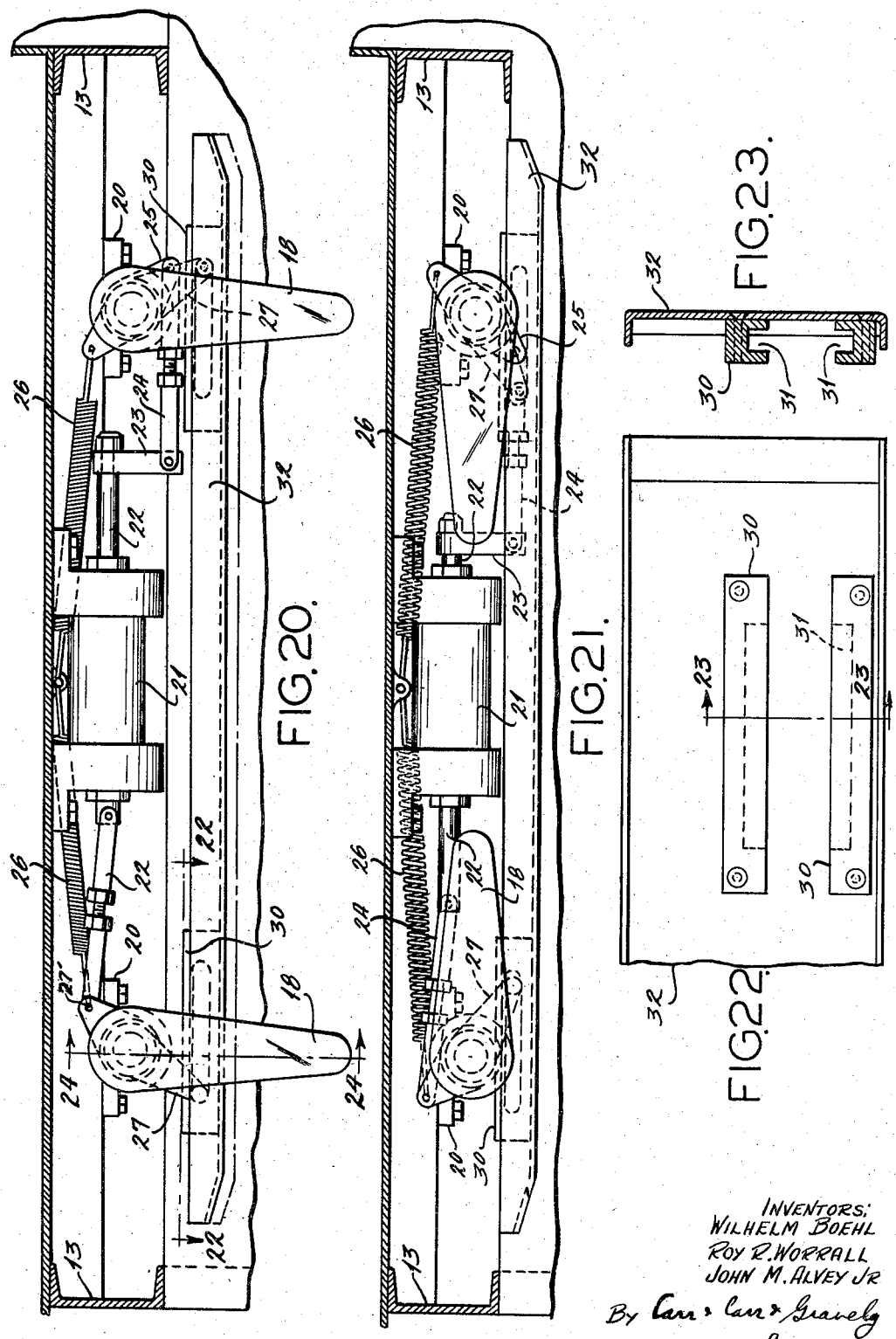

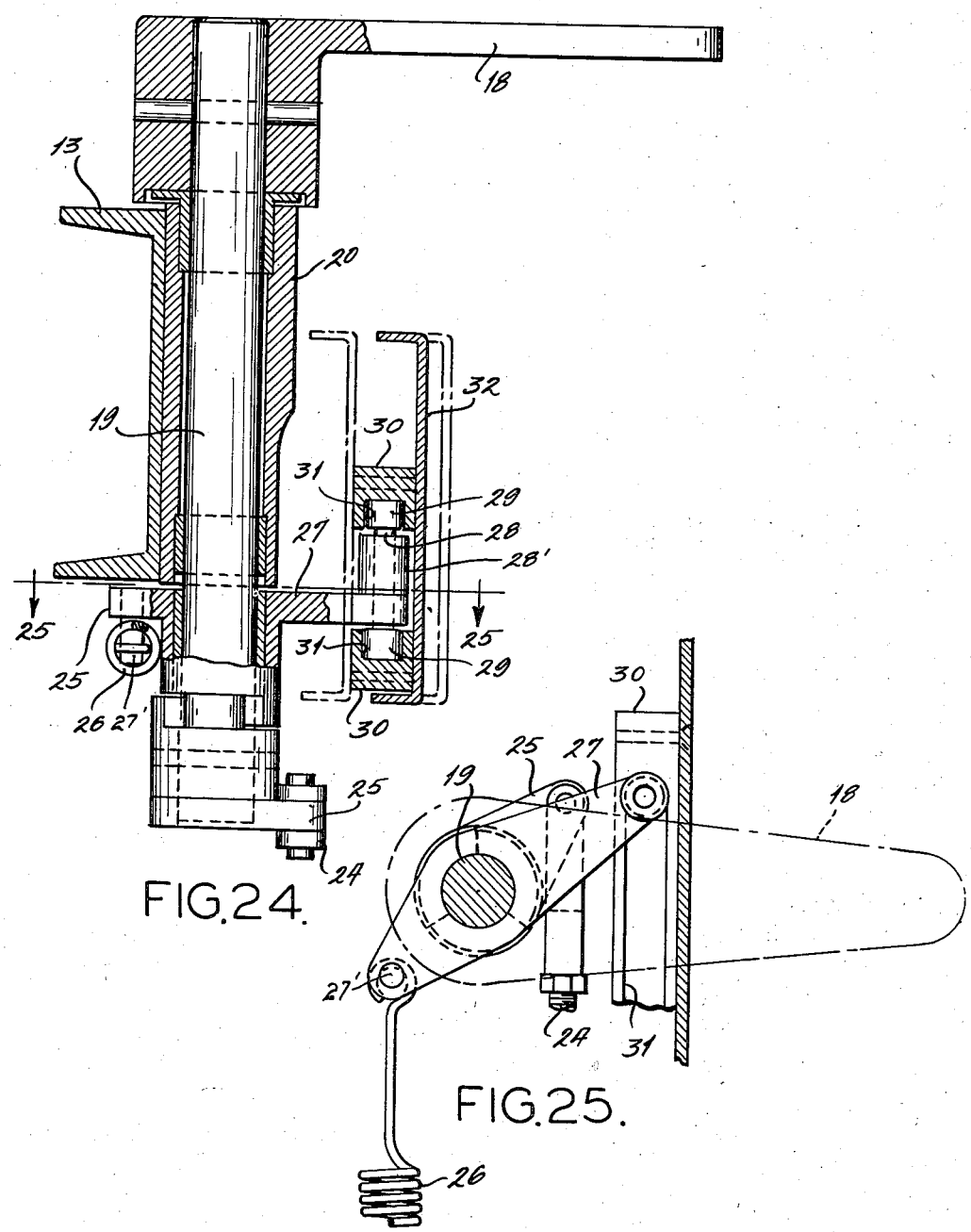

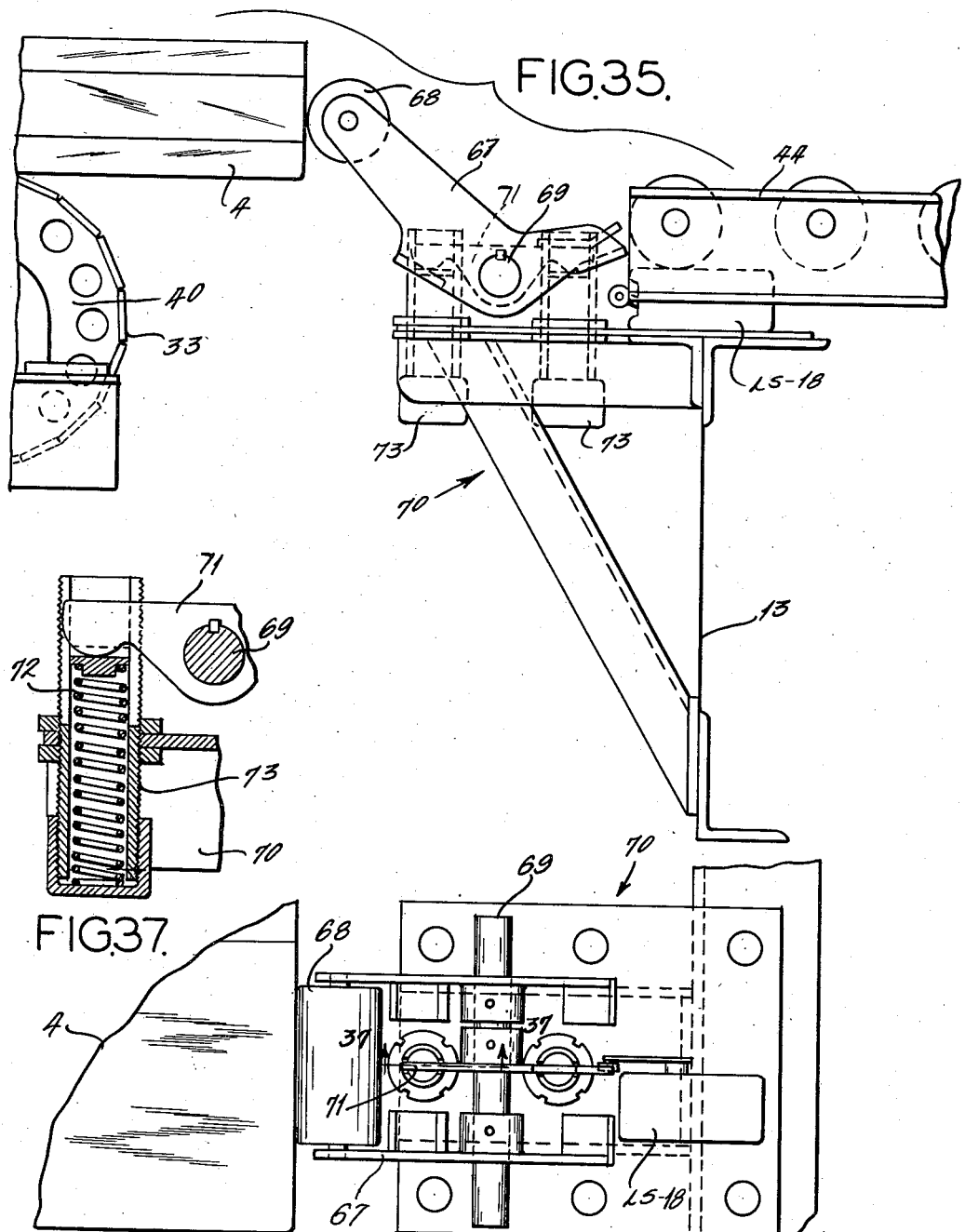

INVENTORS:
WILHELM BOEHL
ROY R. WORRALL
JOHN M. ALVEY JR.
ATTORNEYS.

April 21, 1959

W. BOEHL ET AL 2,883,074

PALLET LOADING MACHINE

Filed Oct. 4, 1951

31 Sheets-Sheet 19

INVENTORS:
WILHELM BOEHL
ROY R. WORRALL
JOHN M. ALVEY JR.
By Carr & Carr & Gravely
ATTORNEYS.

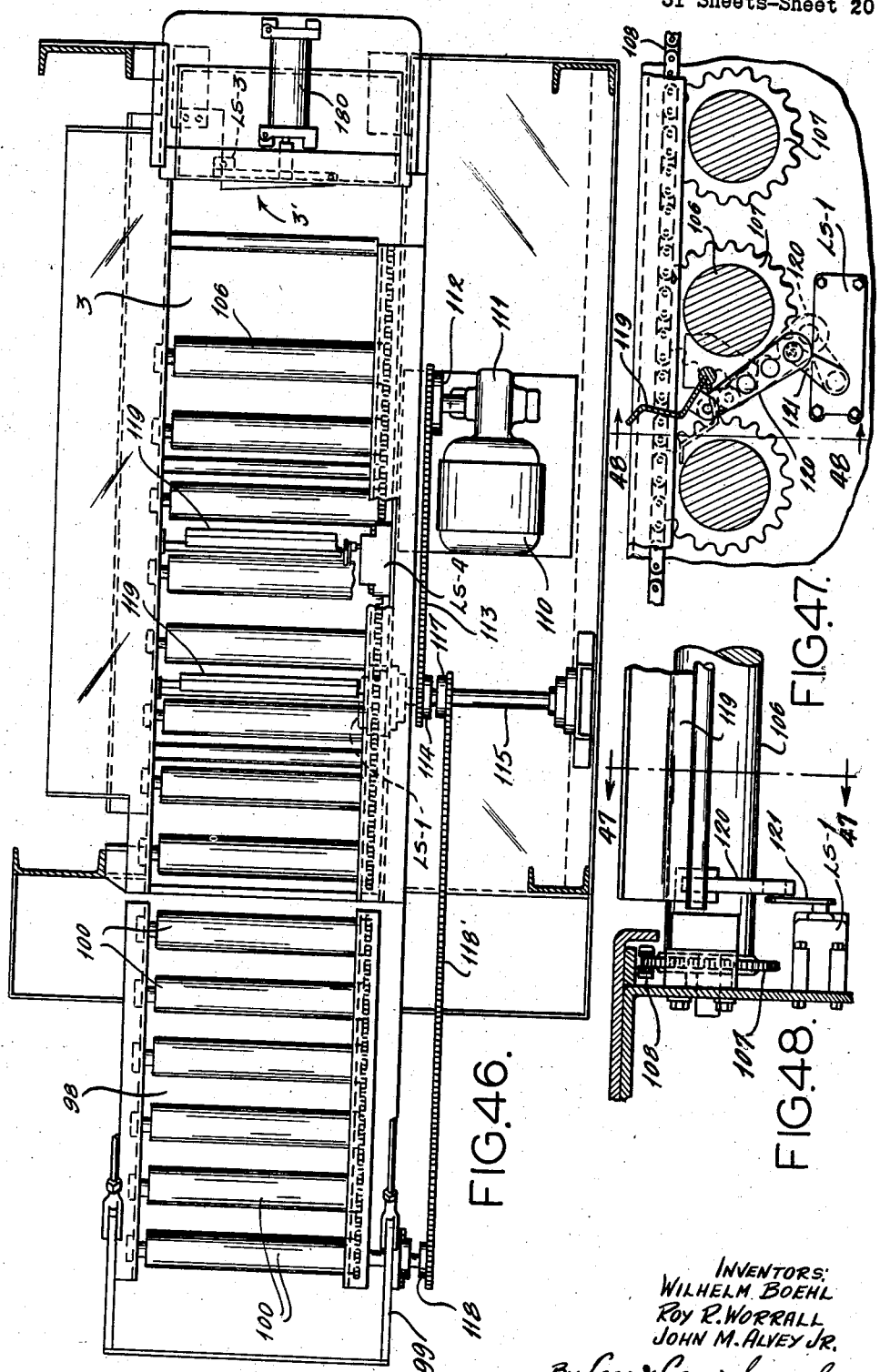

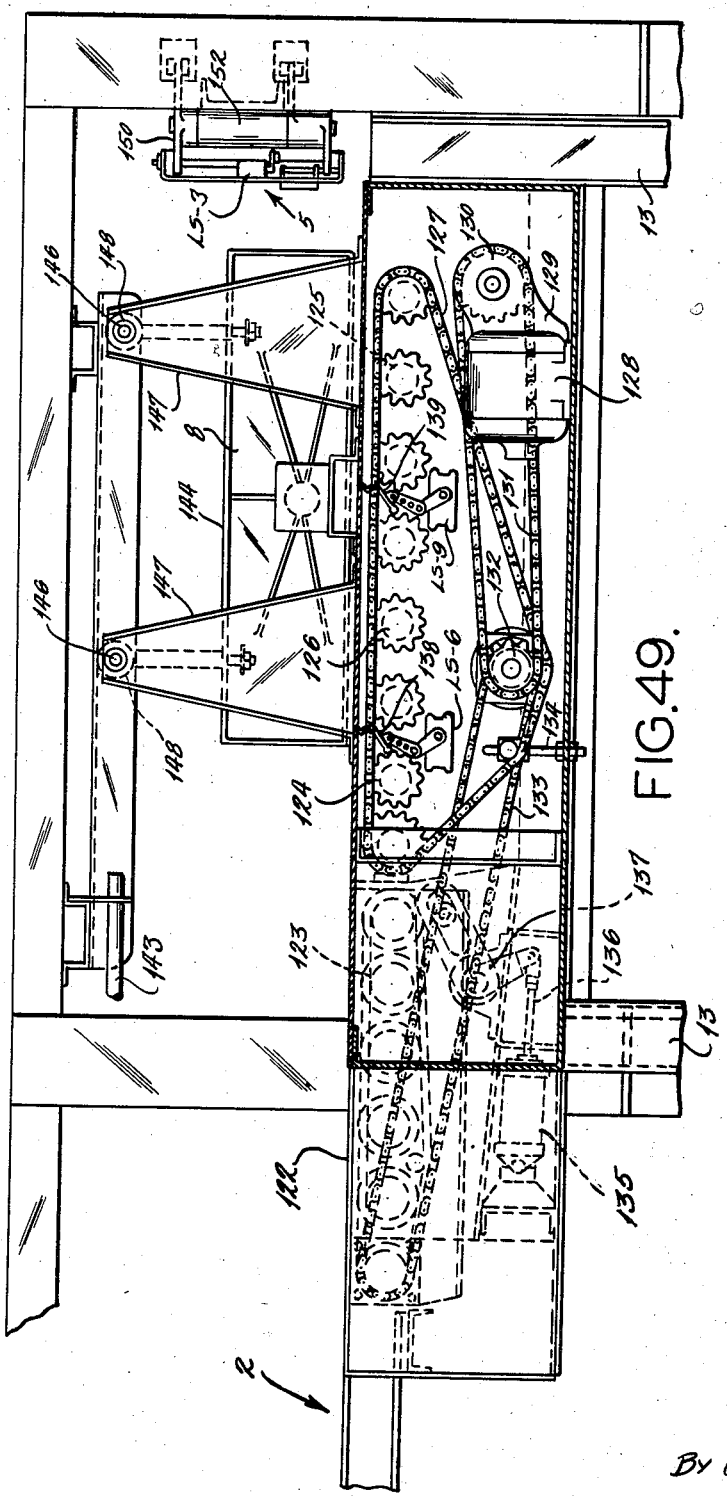

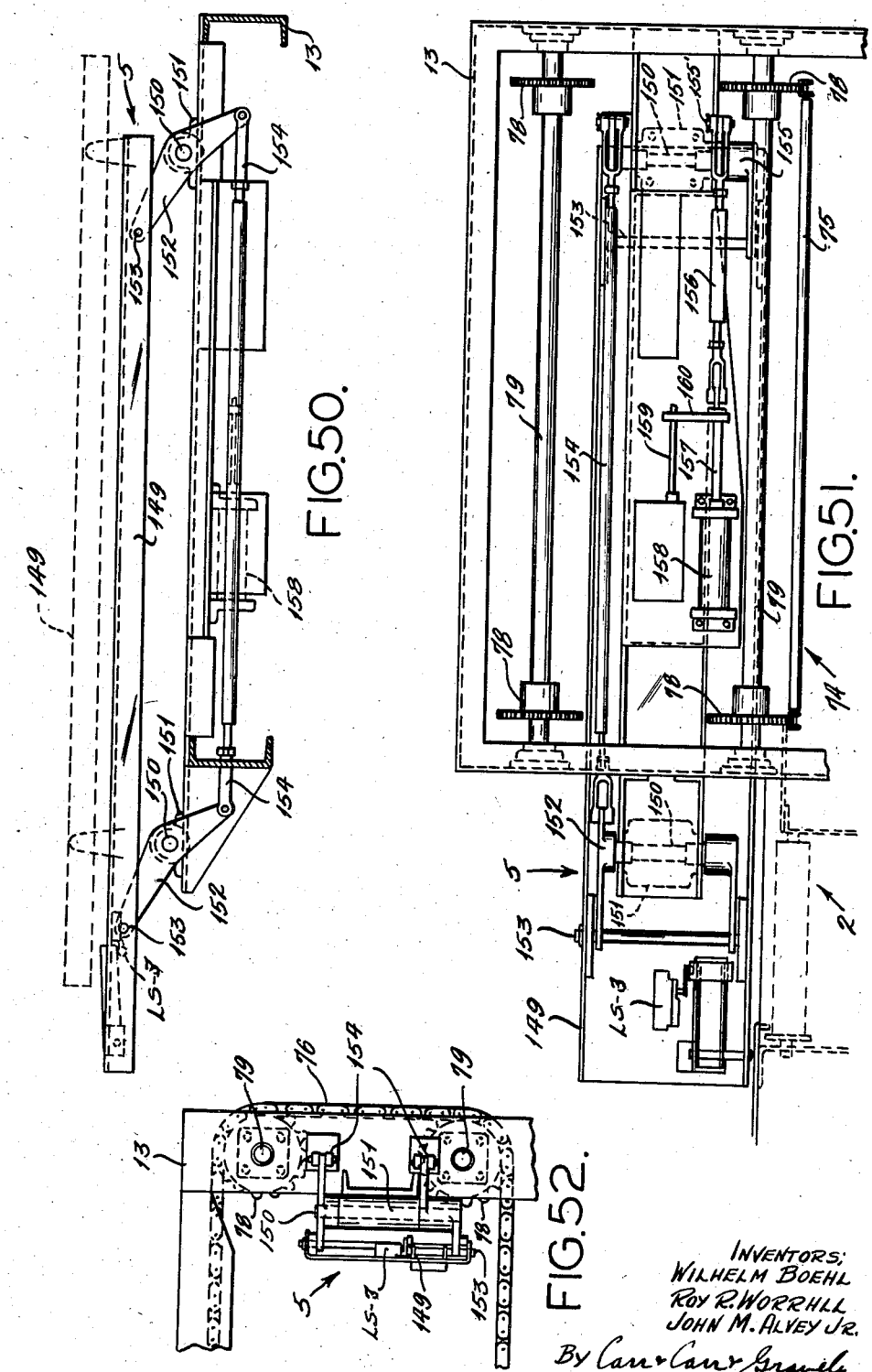

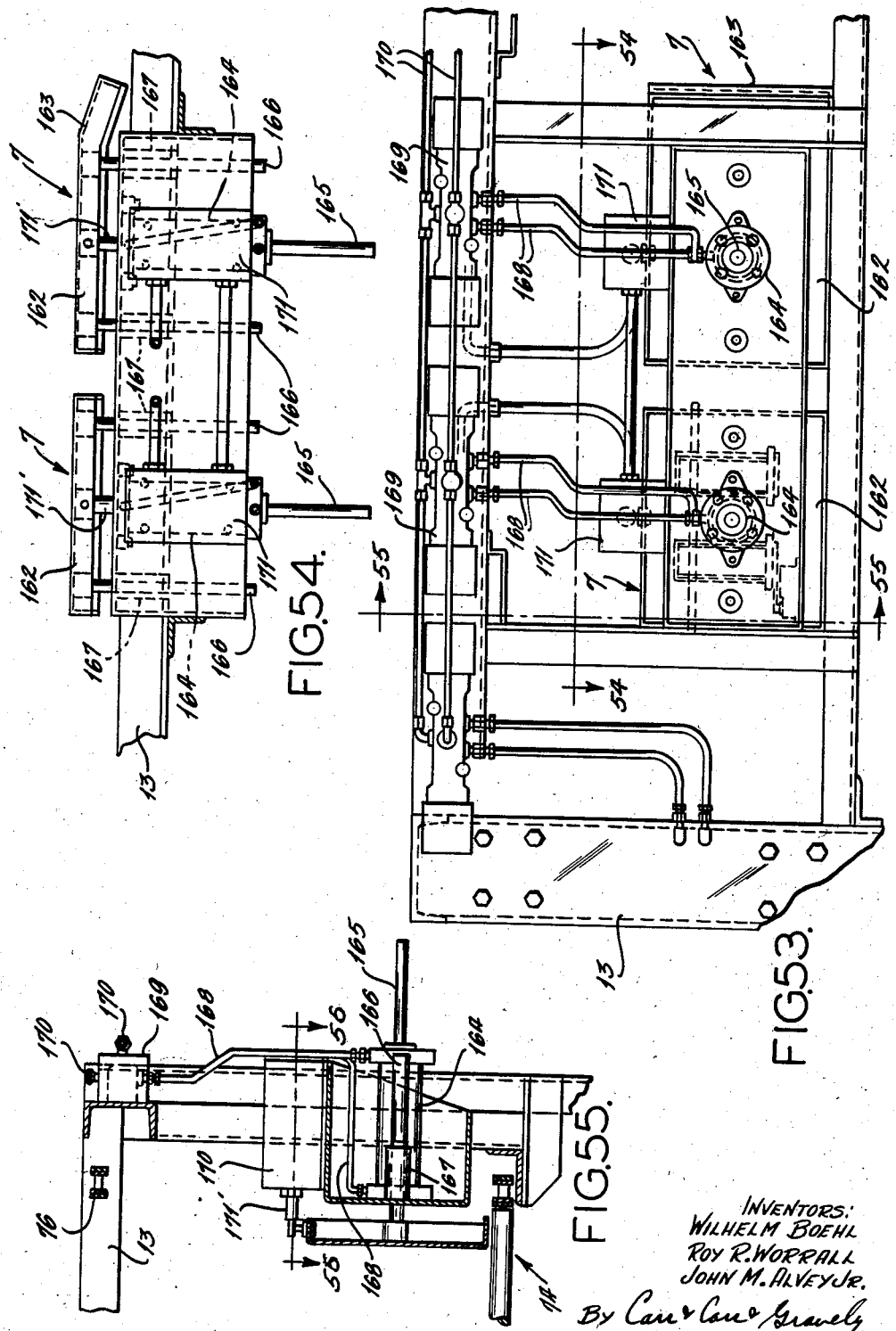

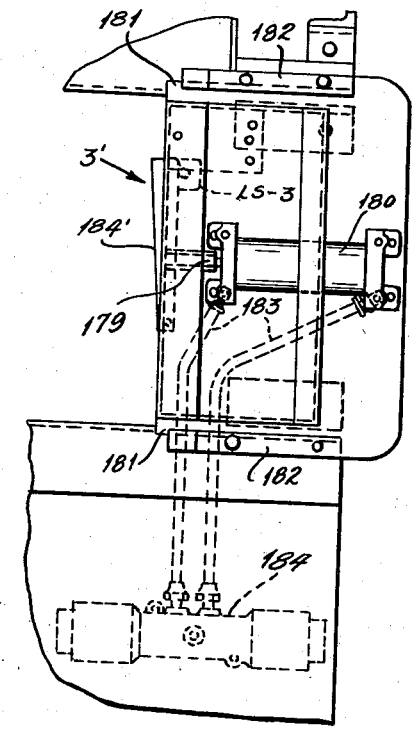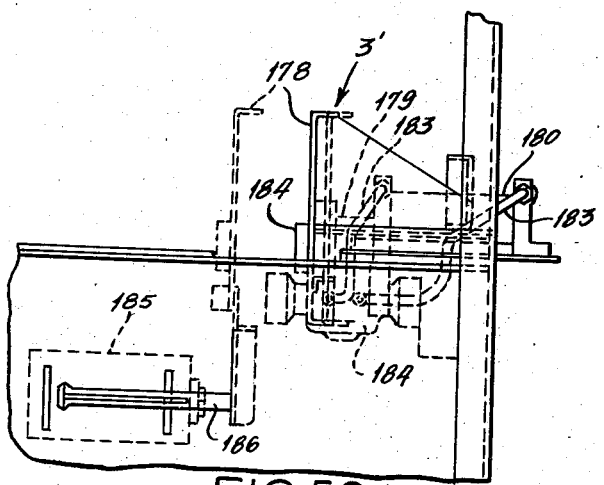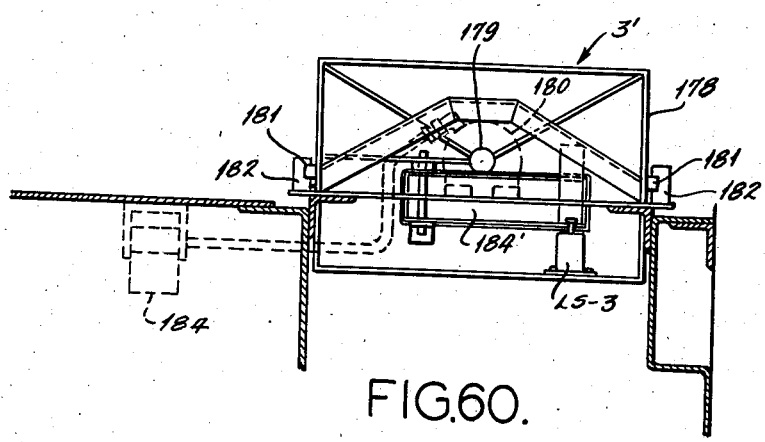

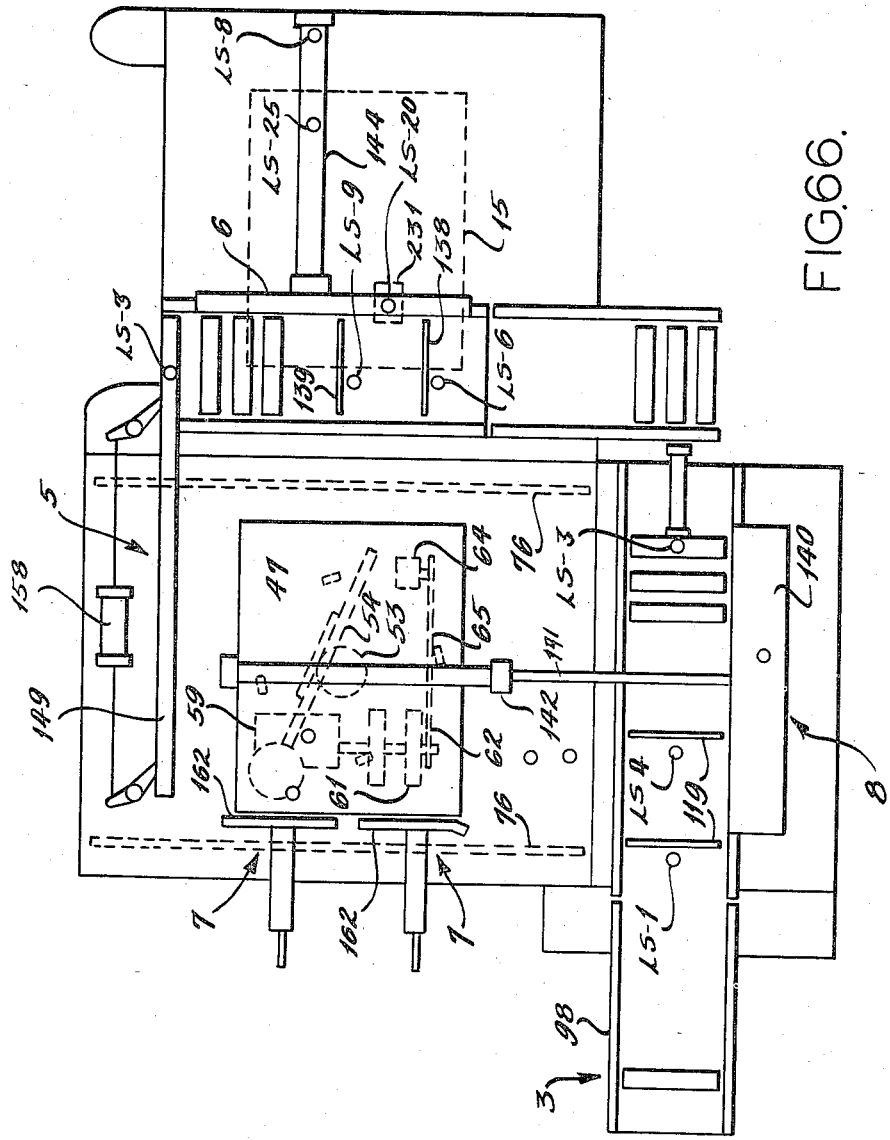

United States Patent Office 2,883,074
Patented Apr. 21, 1959

2,883,074
PALLET LOADING MACHINE

Wilhelm Boehl, Union, N.J., and Roy R. Worrall, Webster Groves, and John M. Alvey, Jr., Normandy, Mo., assignors to Alvey Conveyor Manufacturing Co., St. Louis, Mo., a corporation of Missouri Application October 4, 1951, Serial No. 249,752

13 Claims. (Cl. 214—6)

This invention relates to palleting machines and is more particularly directed to a machine for rapidly changing the patterns of various size packages placed on a pallet being loaded by the machine.

One of the objects of the invention is to provide a palleting machine having a control circuit which may be rapidly changed for altering the patterns of packages being stacked on a pallet.

Another object of the invention is to provide mechanism for indexing the pallet support in a vertical direction.

A further object of the invention is to provide mechanism for correctly presenting similar size packages disposed on a conveyor to the palleting machine on two different sides thereof for stacking on a pallet.

Another and further object is to provide means for arresting movement of the packages on the conveyor while the palleting machine is being indexed in two directions.

Another object of the invention is to provide a machine in which the patterns of packages piled on a pallet is altered by a switch change in the electrical circuits controlling the operation of the machine.

A further object is to provide mechanism for a palleting machine that will correct the alignment of the packages on a pallet.

A still further object is to provide an improved hydraulic-operated mechanism for controlling the timing and motion arresting mechanisms of a palleting machine.

Another and still further object of the invention is to provide an electrical circuit and control therefor that will position an empty pallet on a hoist, lift the hoist to receive stacked packages, cause the packages to be placed on the pallet, index the pallet through 180° periodically, and discharge the loaded pallet from the machine.

Still another object of the invention is to provide an adjustable structure on the machine for aligning the packages above the pallet when the package to be stacked is of a different size from those previously stacked.

Another and still further object of the invention is to provide simple control means whereby the pattern of the packages to be stacked on the pallet may be changed by selectively operating the manual switches for the desired pattern.

The invention consists in the provision of mechanism for feeding similar size packages onto an apron in a predetermined pattern, withdrawing the apron from under the packages, and permitting them to drop onto a pallet resting on the pallet supporting member mounted on a hoist.

The invention further consists in the provision of mechanism for indexing the pallet supporting member vertically and other mechanism for indexing it laterally in order that the successive layers of packages may be interlocked.

The invention also consists in the provision of means for storing a supply of pallets, feeding them onto the pallet supporting member, and holding the pallet in position after it is fed thereon.

The invention further consists in the provision of mechanism for aligning a pallet on the pallet feeding device so that it will be correctly aligned on the pallet supporting member.

The invention also consists in the provision of mechanism for preventing the feeding of an empty pallet on the pallet supporting member until the loaded pallet has been removed from the machine.

The invention further consists in the provision of stop or dam members opposite the fluid motors for moving the packages onto the apron for correctly aligning them with the pallet and which are also adjustable so that different size packages may be arranged on the apron without altering the physical relationship of the parts.

The invention also consists in the provision of a circuit for adjusting the machine for different arrangement of packages on the loading apron.

The invention further consists in the provision of an electrical circuit for controlling the pallet hoist wherein the pallet and tiers of packages thereon will be correctly located under an apron for receiving the packages of the next tier.

The invention also consists in the provision of spacing means including tiltable portions in the conveyor lines operable by counting or memory switches for correctly counting and arranging the packages on the loading apron.

Figure 7:
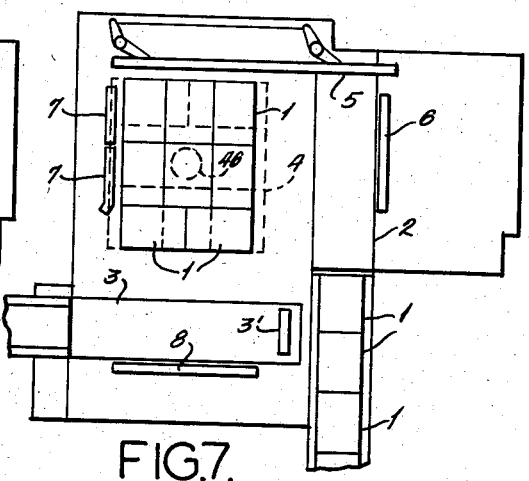
Figure 8:
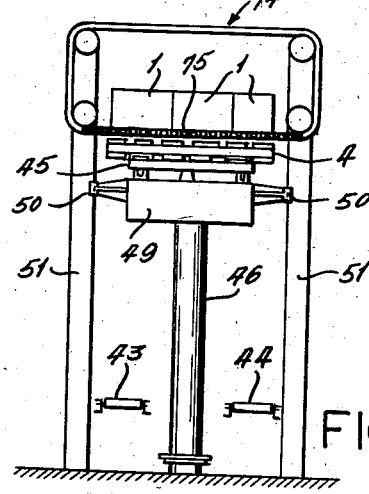
Figure 9:
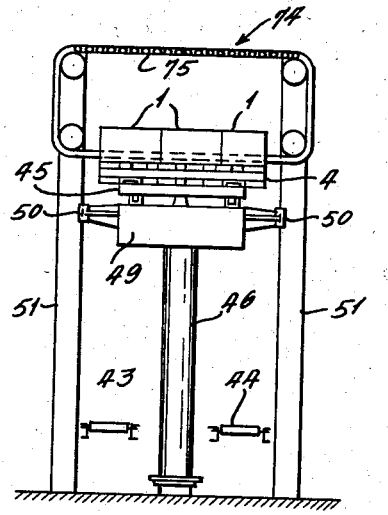
Figure 10:
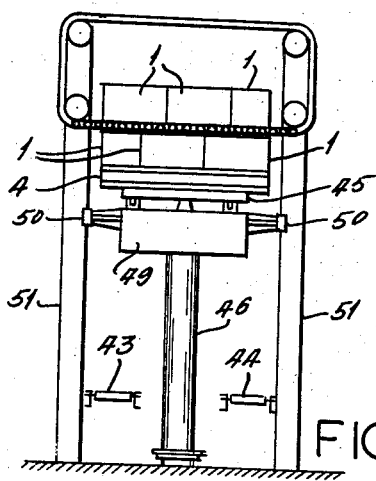
Figure 13:
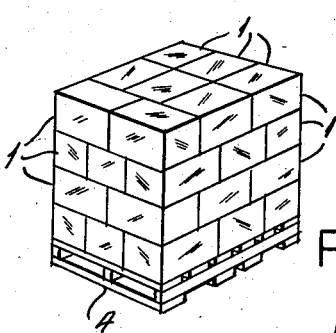
Figure 15:
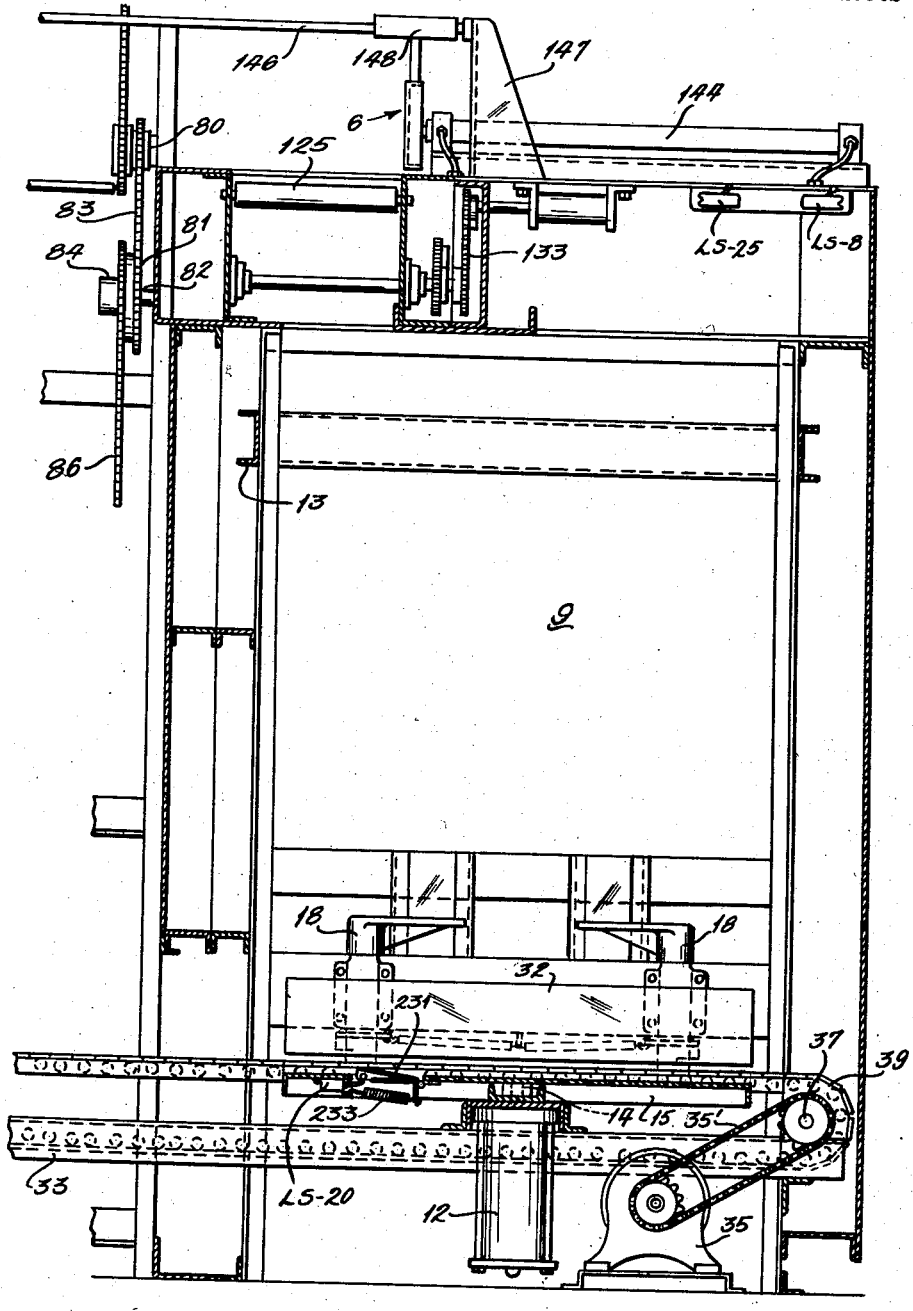
Figure 16:
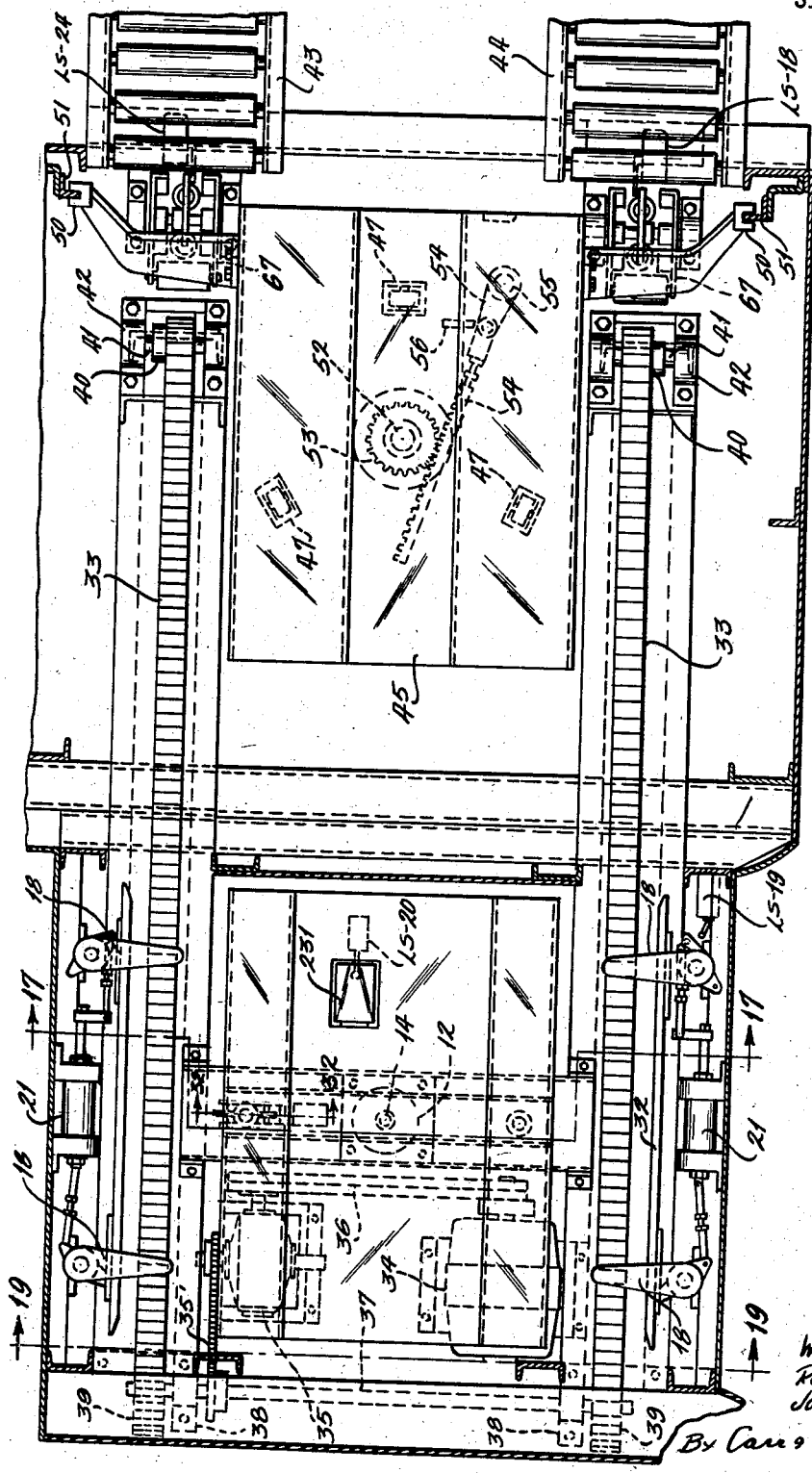
Figure 17:
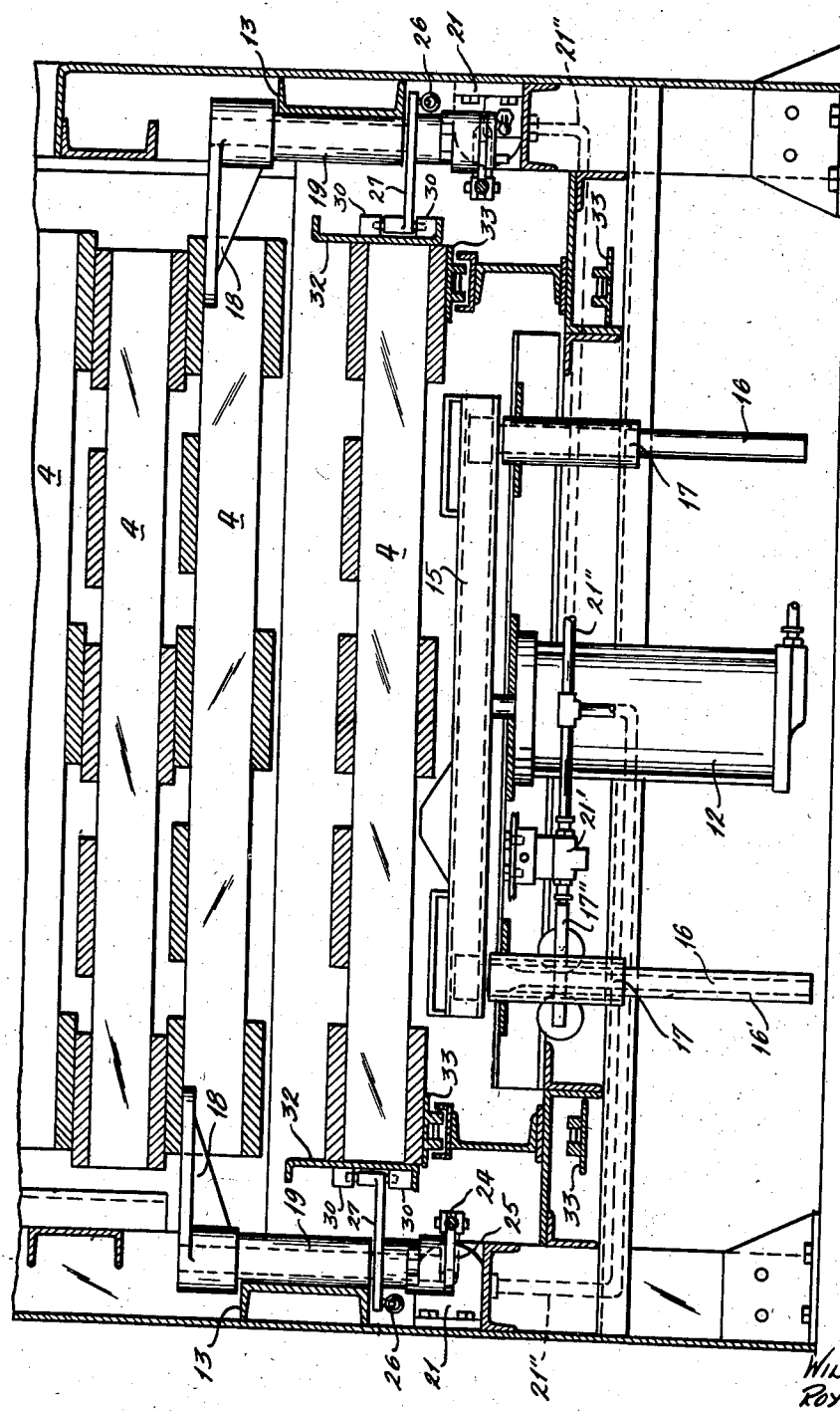
Figure 18:
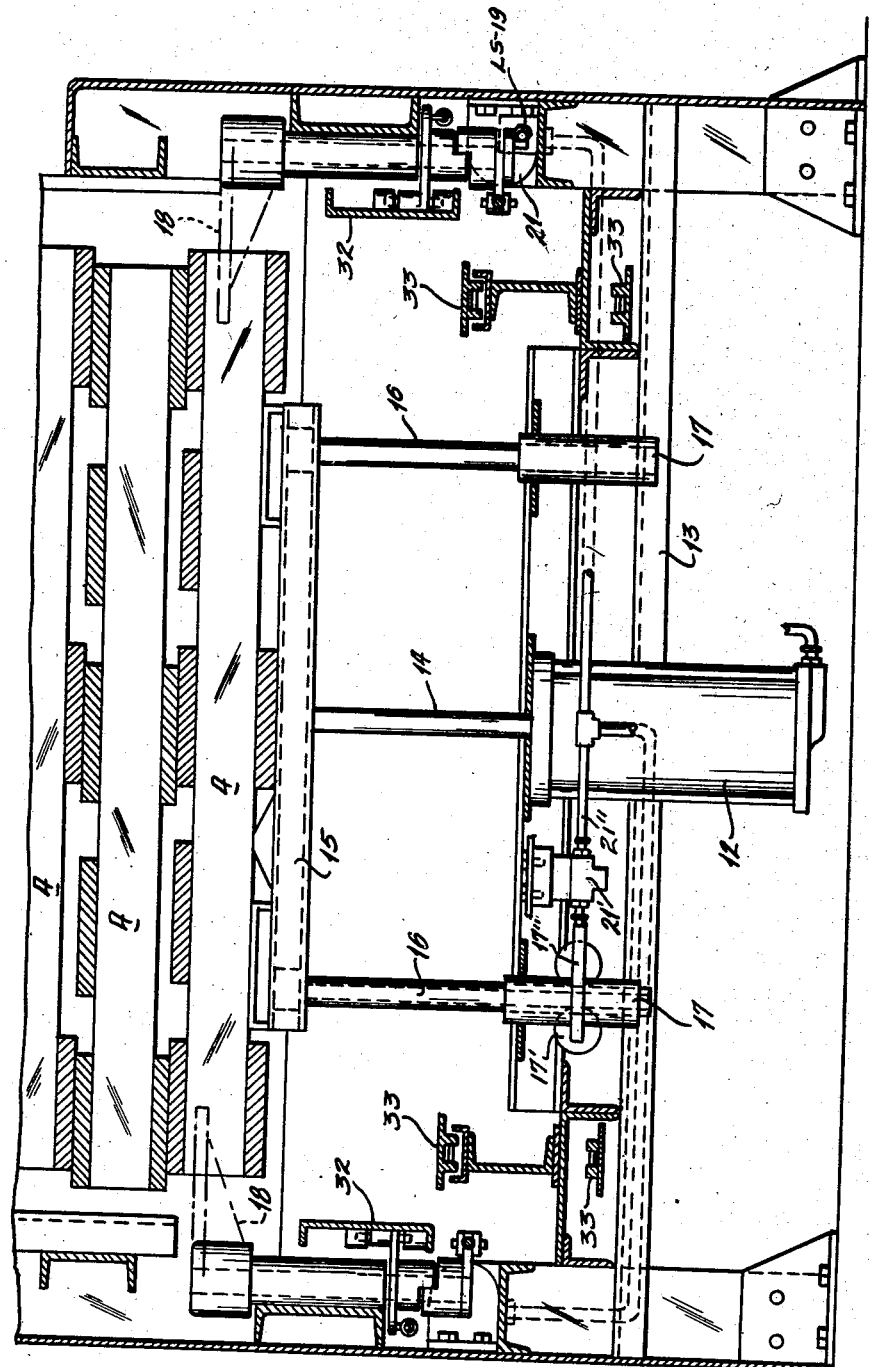
Figure 19:
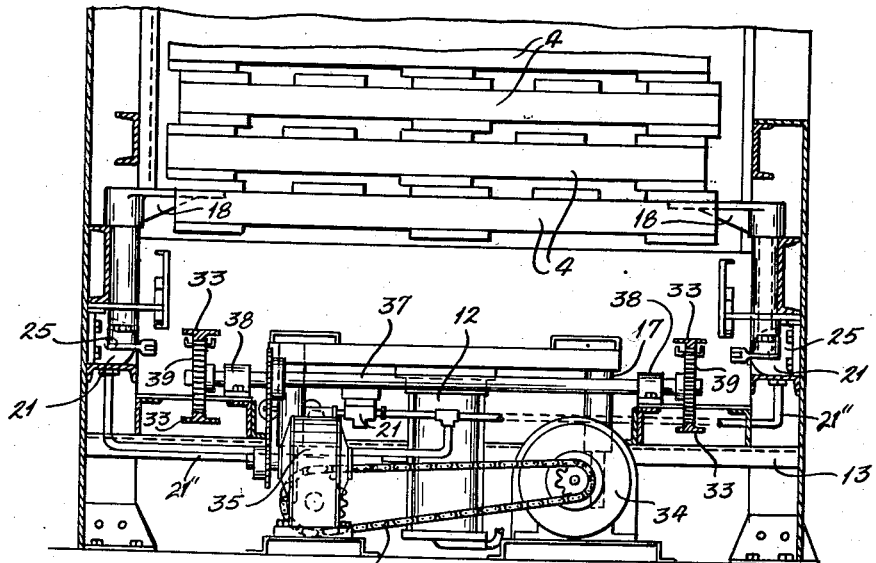
Figure 30:
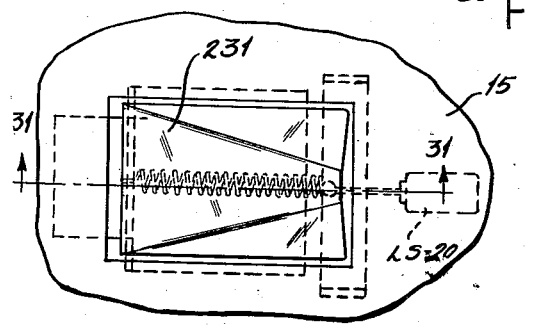
Figure 26:
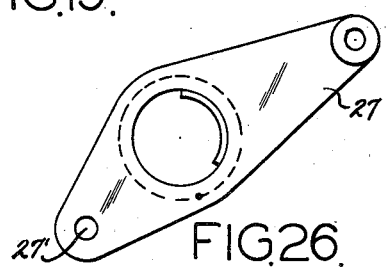
Figure 31:
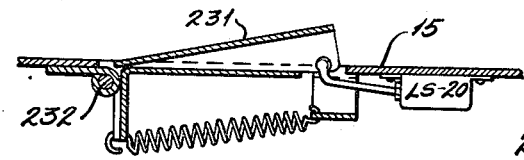
Figure 27:
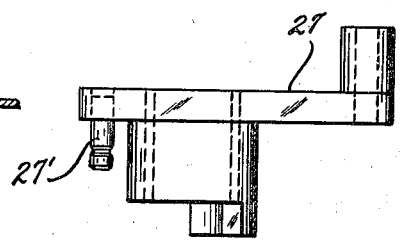
Figure 29:
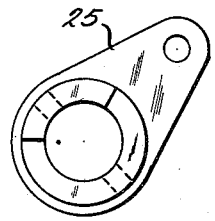
Figure 28:
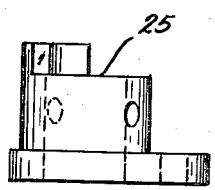
Figure 62:
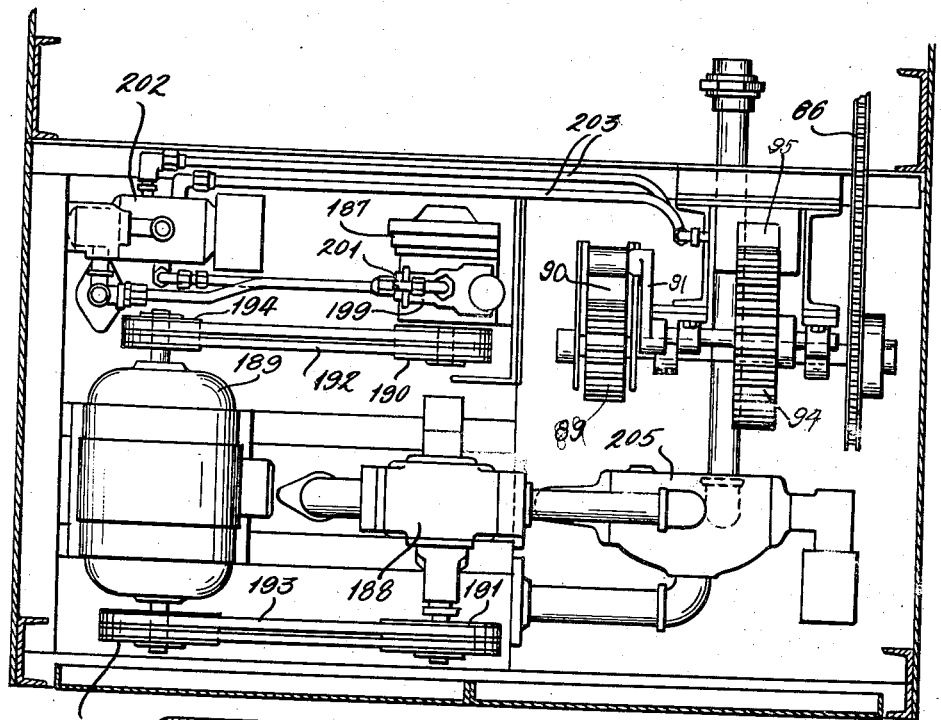
Figure 32:
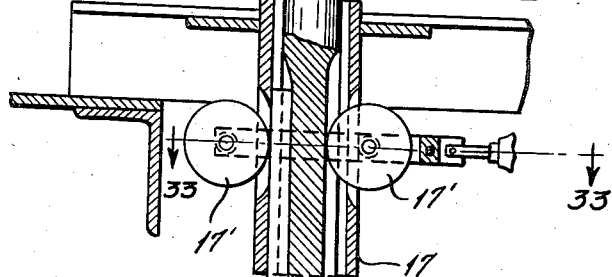
Figure 33:
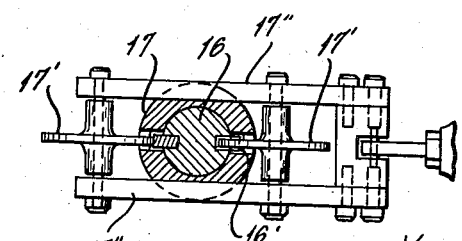
Figure 34:
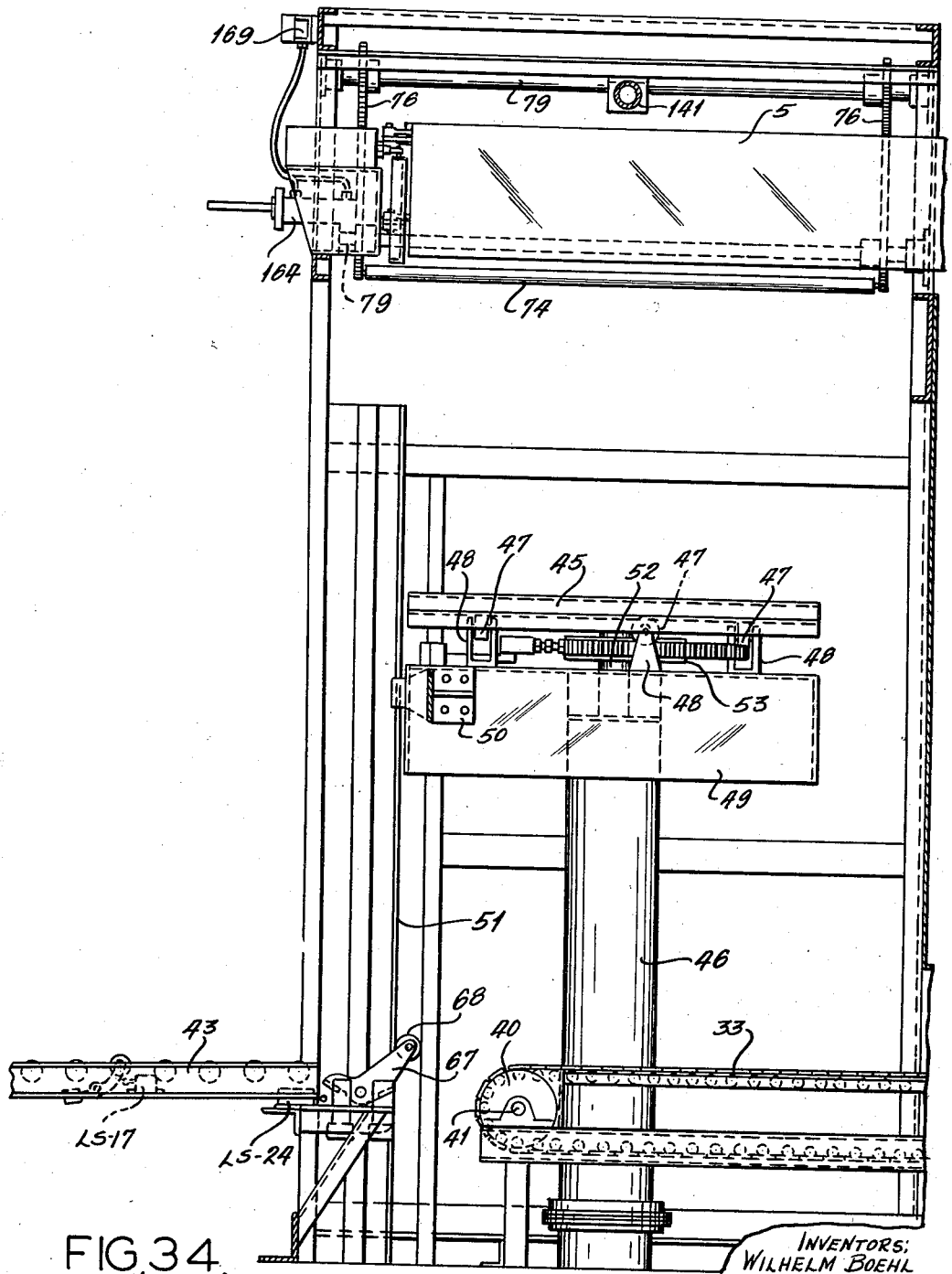
Figure 38:
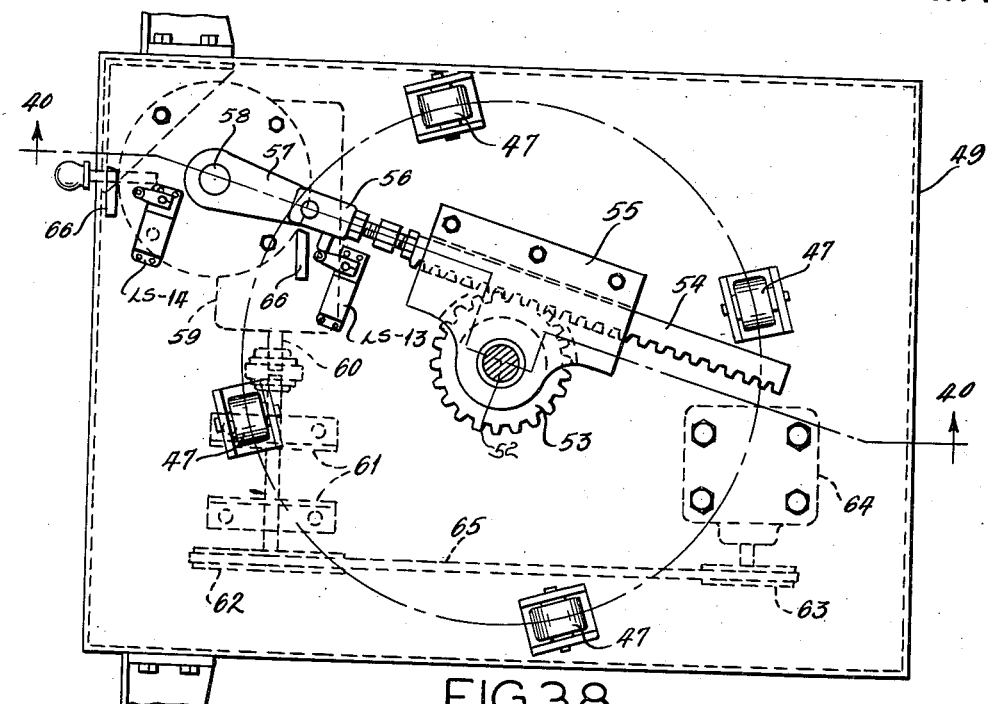
Figure 39:
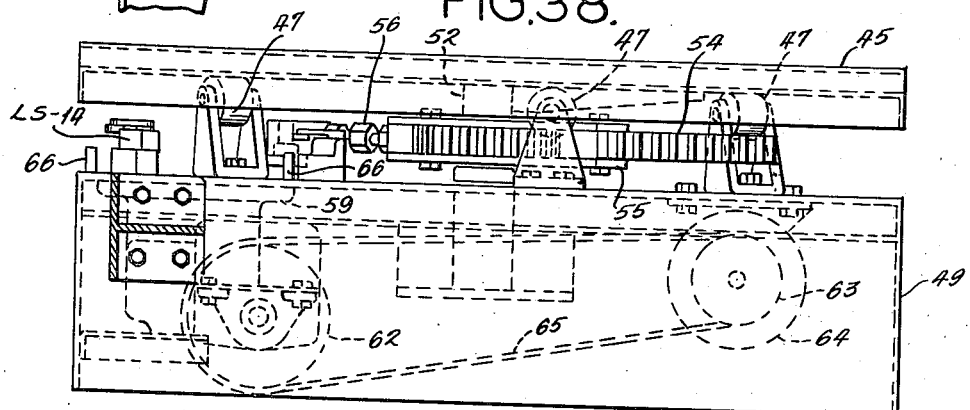
Figure 40:
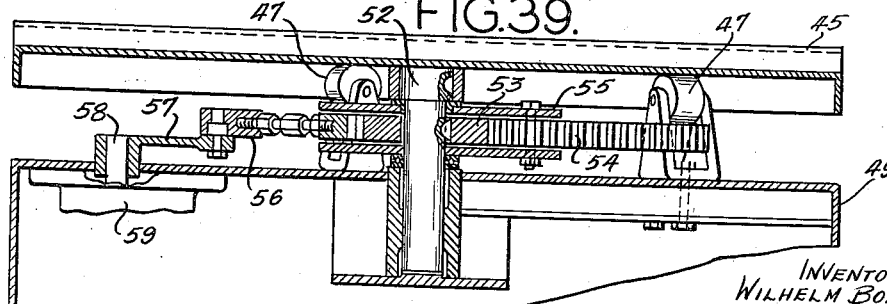
Figure 41:
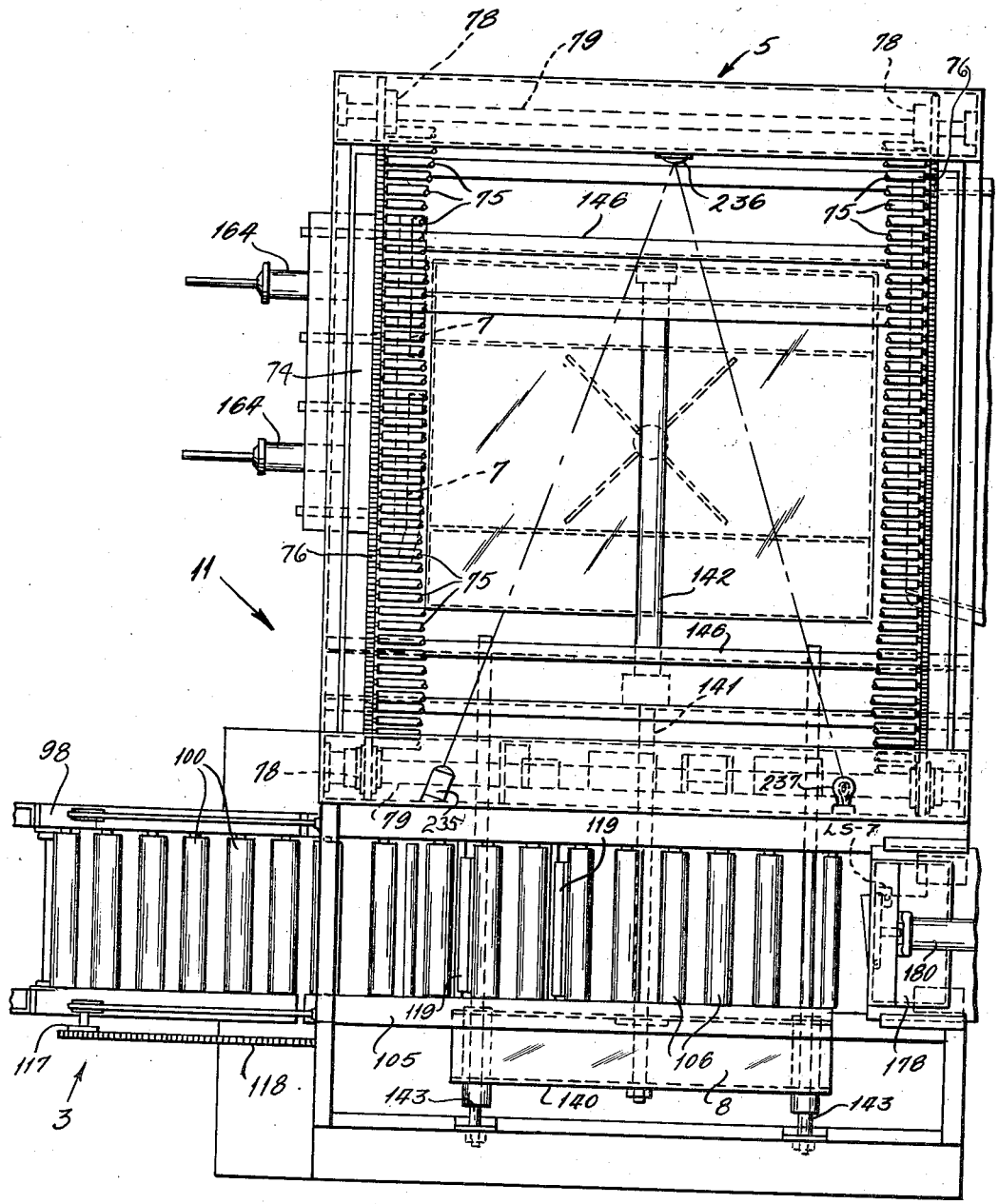
Figure 42:
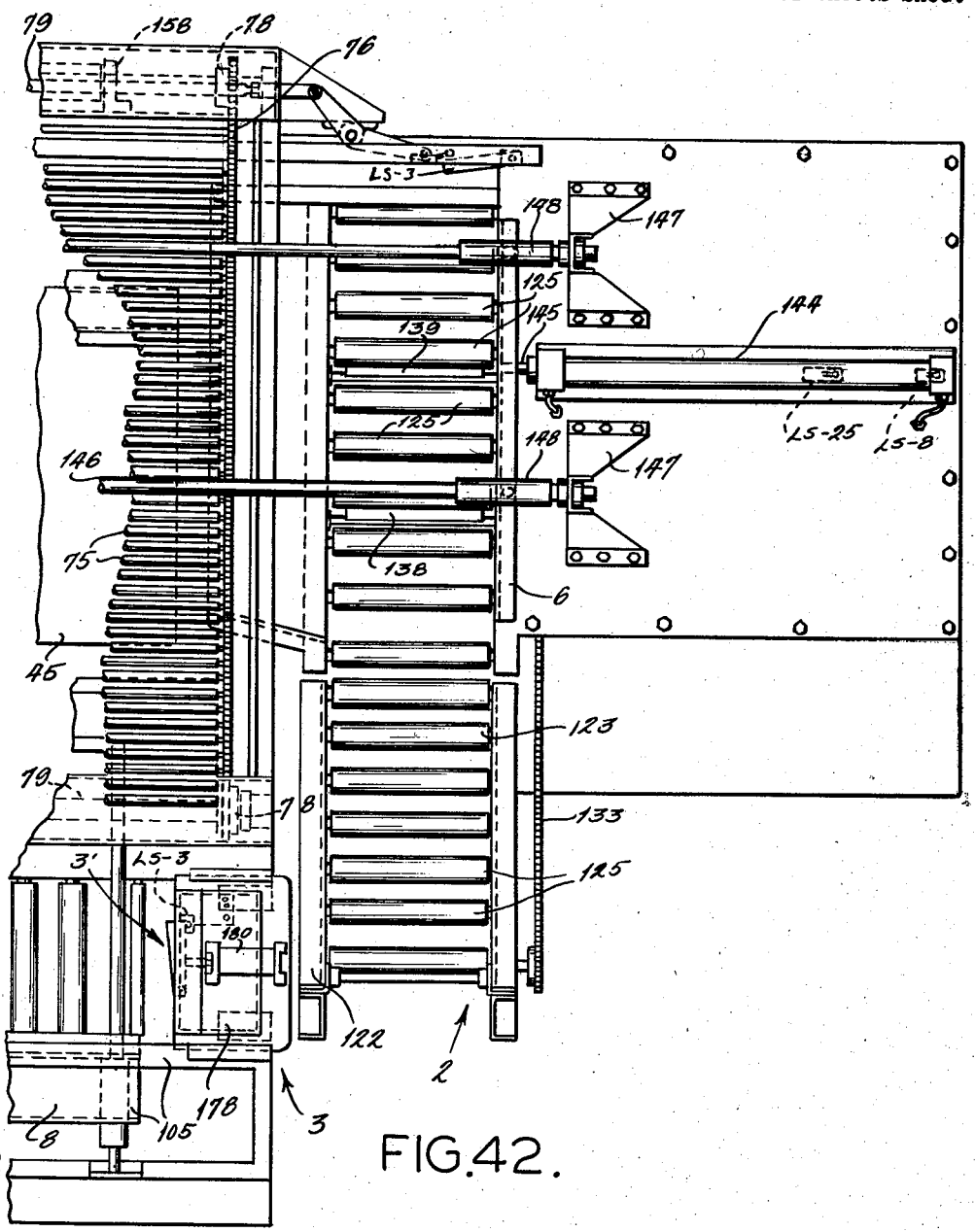
Figure 43:
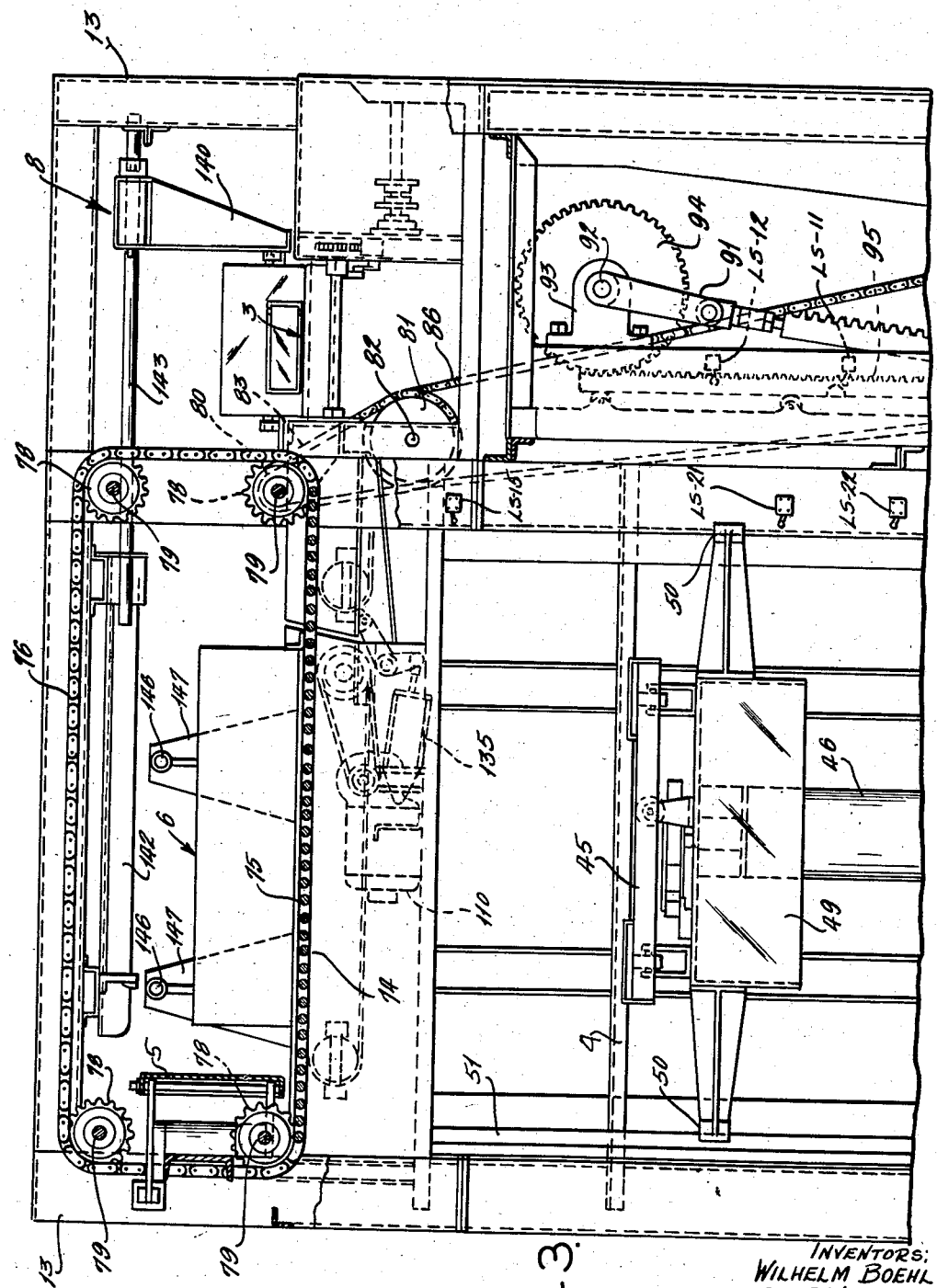
Figure 44:
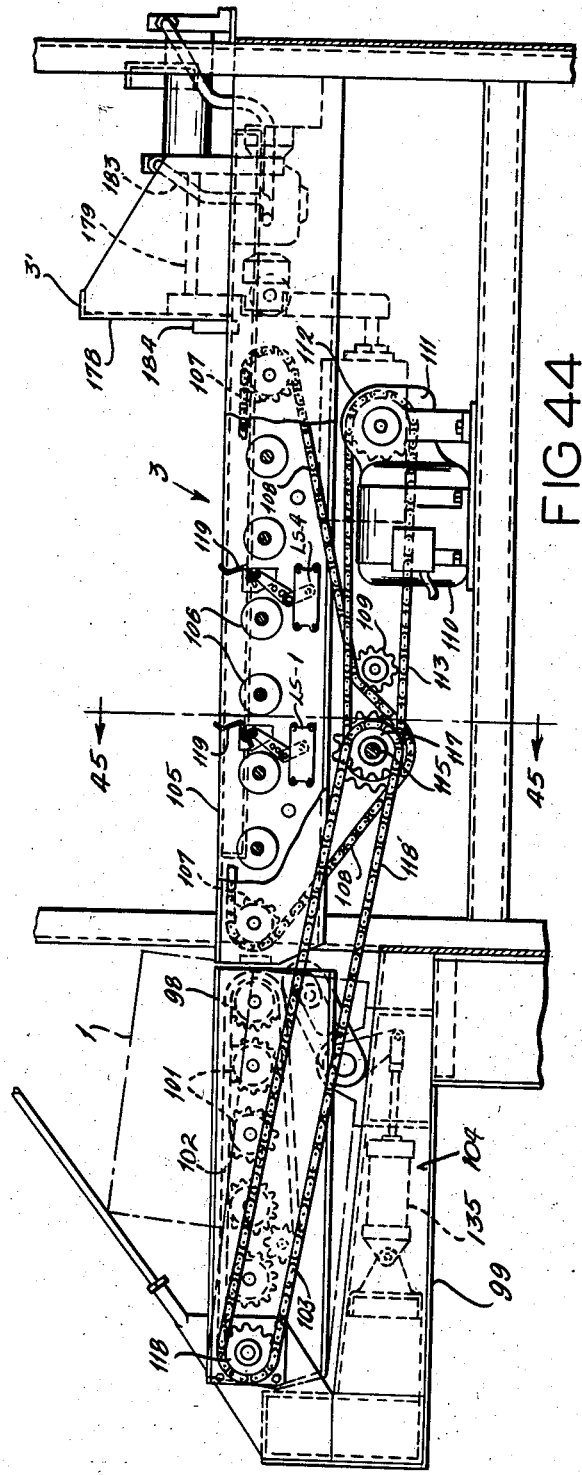
Figure 45:
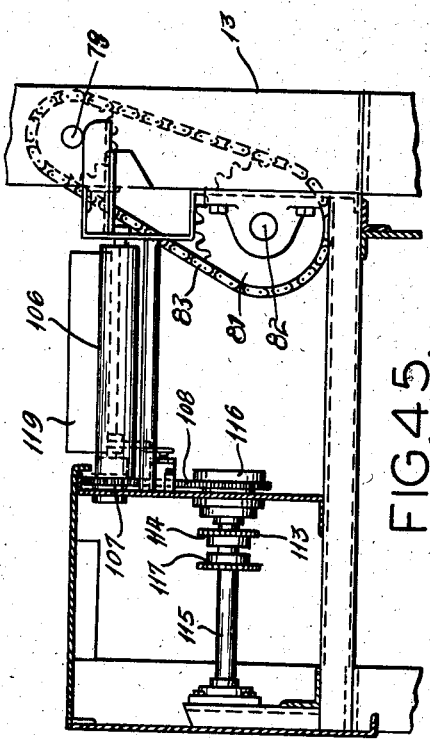
Figure 61:
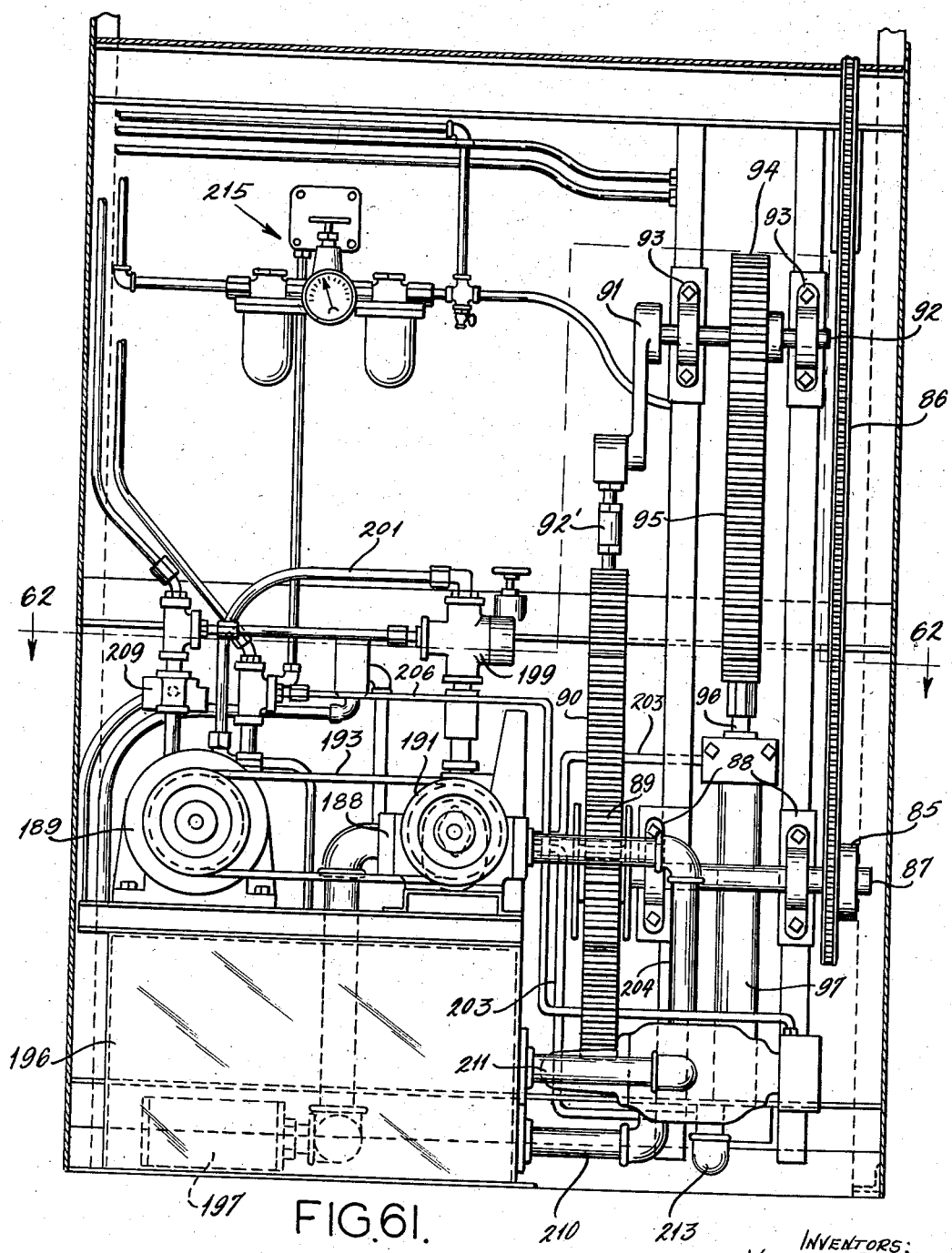
Figure 63:
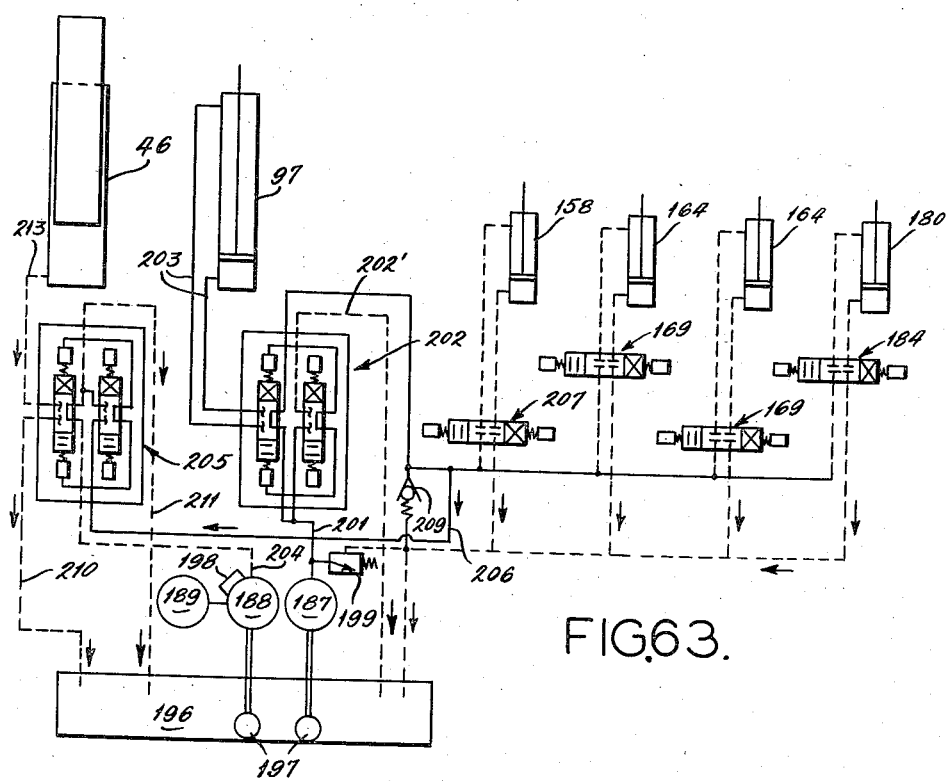
Figure 64:
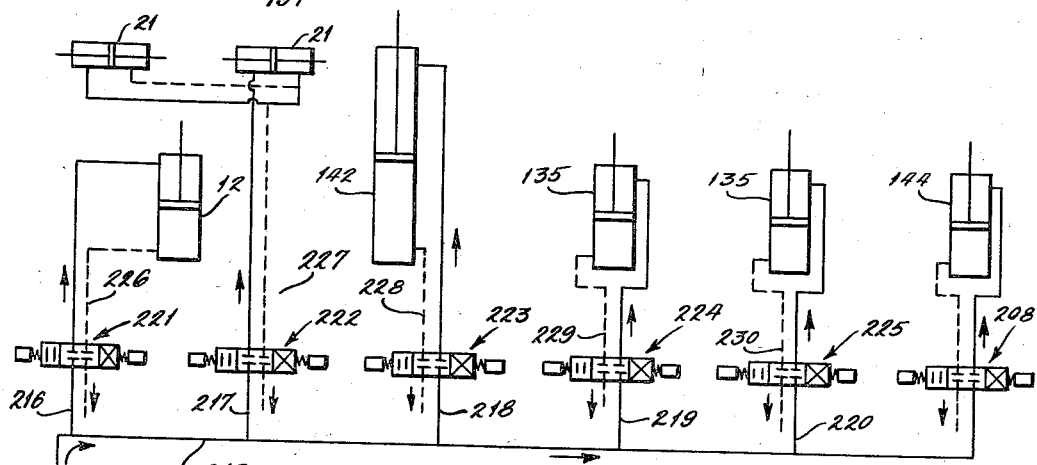
Figure 65:
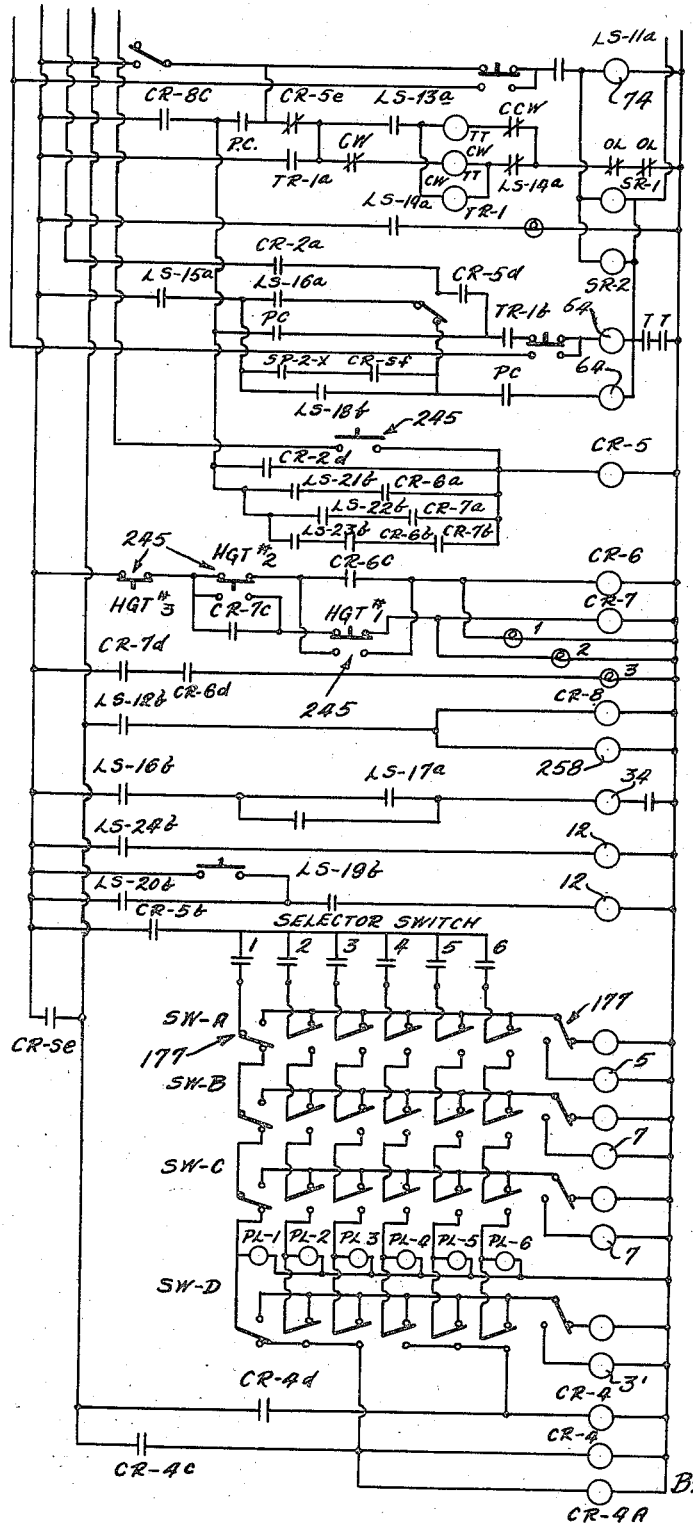
Figure 65A:
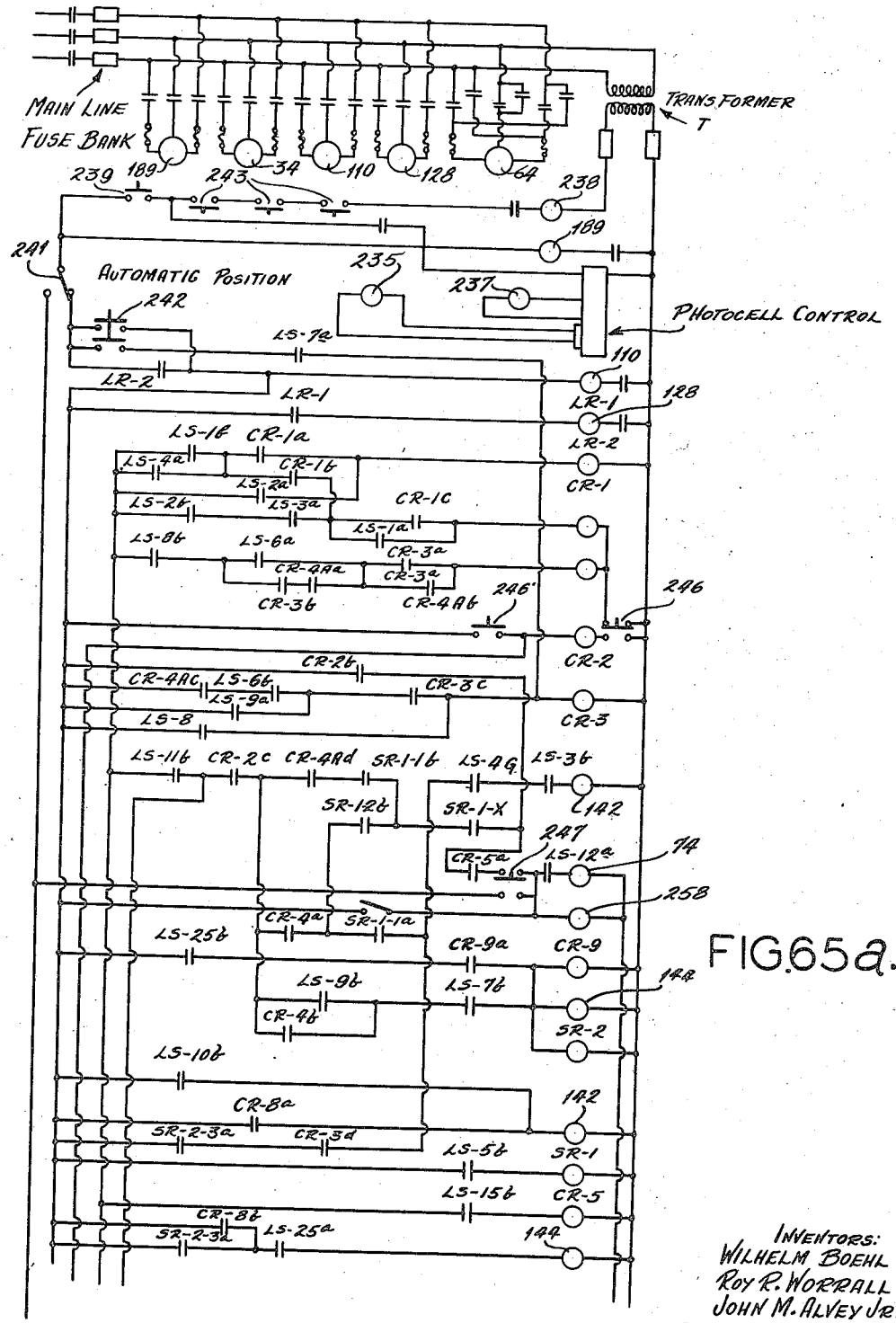
Figure 67:
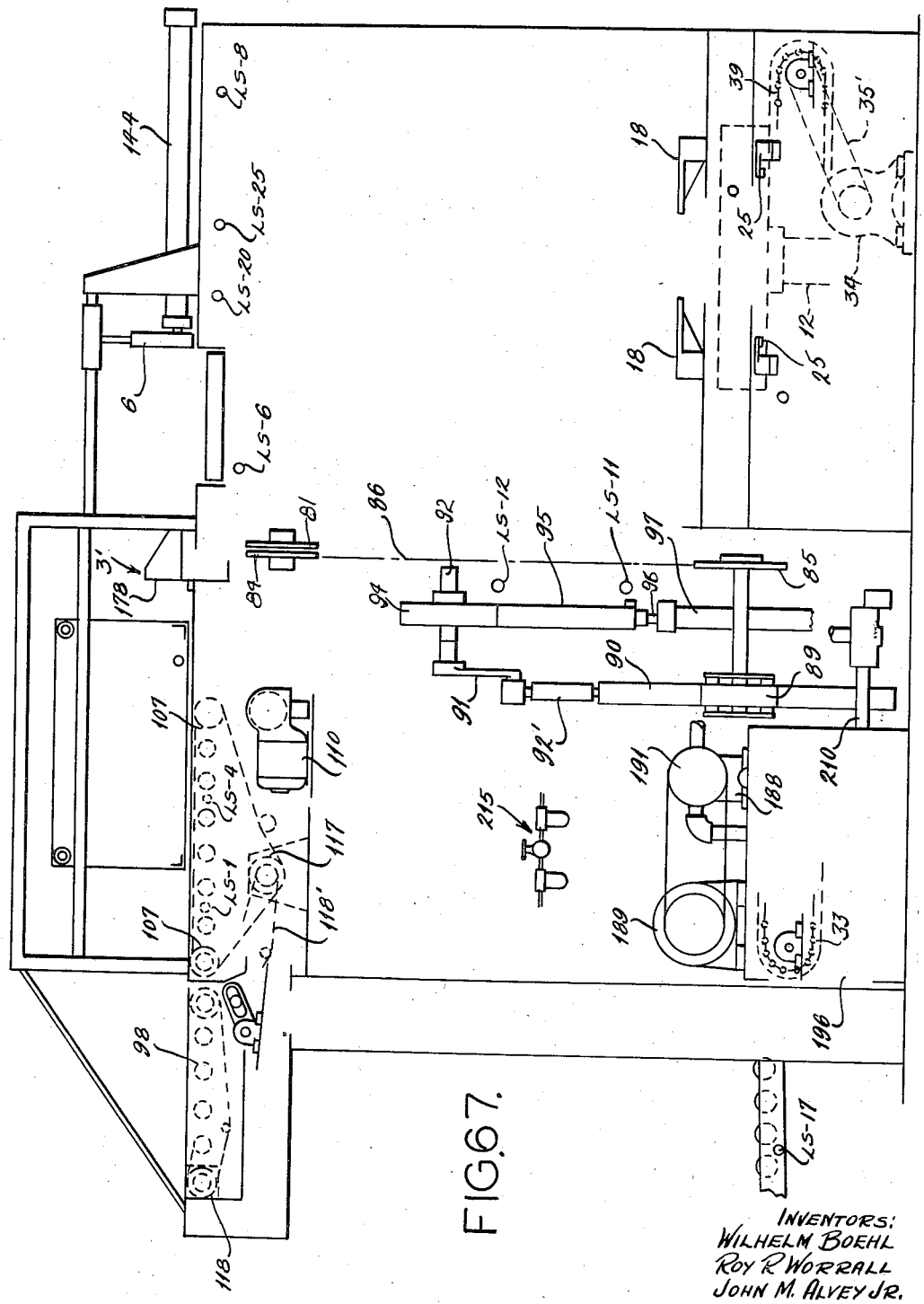
Figure 68:
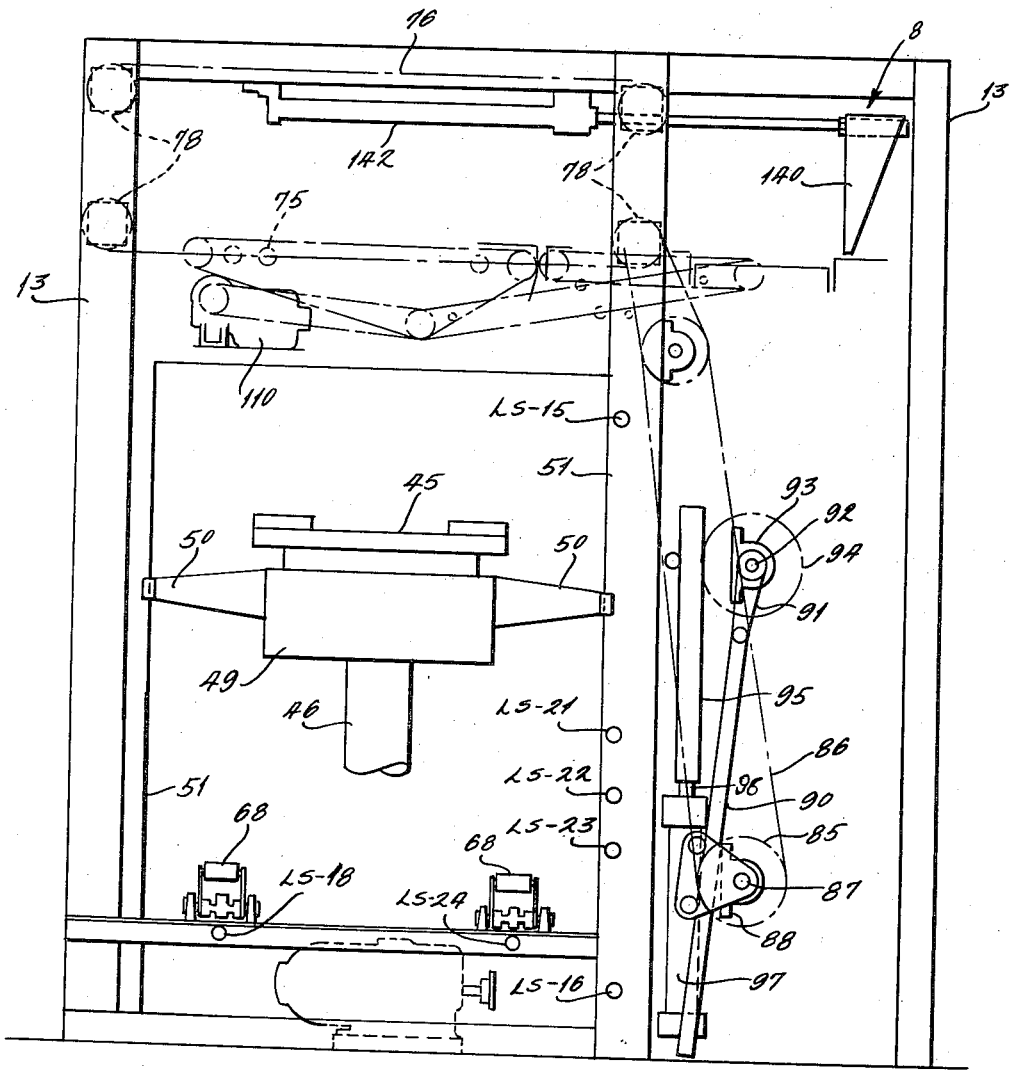

In the drawings:

Figs. 1 through 7 are schematic views showing one method of stacking packages on a pallet, Fig. 8 is a schematic view showing the location of the pallet hoist ready to receive the first layer of packages, Fig. 9 is a schematic view, similar to Fig. 8, immediately after the pallet has received the first layer of packages, Fig. 10 is a view similar to Fig. 8 with the pallet rotated 180° ready to receive the second layer of packages, Fig. 11 is a view similar to Fig. 8 showing the pallet with two layers of packages thereon, Fig. 12 is a view similar to Fig. 8 with a pallet loaded and the package receiving element restored to its original position, Fig. 13 is a perspective view of a loaded pallet, Fig. 14 is a side elevational view of a machine embodying the invention, parts being broken away to show detail, Fig. 15 is an enlarged side elevational view of the pallet magazine and feeding part of the machine shown in Fig. 14, parts being omitted to show detail, Fig. 16 is a sectional view taken substantially along the line 16—16 of Fig. 14, Fig. 17 is a vertical sectional view looking in the direction of the line 17—17 of Fig. 16, Fig. 18 is a view similar to Fig. 17 showing a pallet released from the stack, Fig. 19 is a sectional view taken substantially along the line 19—19 of Fig. 16, Fig. 20 is an enlarged plan view of the pallet releasing mechanism shown in Fig. 16, Fig. 21 is a view similar to Fig. 20, parts thereof being in a different position, Fig. 22 is a sectional view taken substantially along the line 22—22 of Fig. 20, Fig. 23 is a sectional view taken substantially along the line 23—23 of Fig. 22, Fig. 24 is a sectional view taken substantially along the line 24—24 of Fig. 20, Fig. 25 is a sectional view taken substantially along the line 25—25 of Fig. 24, Fig. 26 is a plan view of one of the parts shown in Fig. 25, Fig. 27 is a side elevational view of the part shown in Fig. 26, Fig. 28 is a side elevational view of a part of the mechanism shown in Fig. 24, Fig. 29 is a plan view of the part shown in Fig. 28, Fig. 30 is an enlarged plan view of a switch actuator shown in Fig. 16, Fig. 31 is a sectional view taken along the line 31—31 of Fig. 30, Fig. 32 is a sectional view taken substantially along the line 32—32 of Fig. 16, Fig. 33 is a sectional view taken substantially along the line 33—33 of Fig. 32, Fig. 34 is a side elevational view of the machine with parts in section to show detail, Fig. 35 is an enlarged elevational view of a part of the mechanism shown in Fig. 34, Fig. 36 is a plan view of the mechanism shown in Fig. 35, Fig. 37 is a sectional view taken substantially along the line 37—37 of Fig. 36, Fig. 38 is an enlarged plan view of the pallet support shown in Figs. 16 and 34, Fig. 39 is a side elevational view thereof, Fig. 40 is a sectional view taken substantially along the line 40—40 of Fig. 38, Fig. 41 is a plan view of part of the pallet loading machine, Fig. 42 is a plan view of the portion of the pallet loading machine not shown in Fig. 41, Fig. 43 is an enlarged side elevational view of the upper portion of the machine shown in Fig. 34, Fig. 44 is an enlarged elevational view of the package actuated counting mechanism, Fig. 45 is a sectional view taken substantially along the line 45—45 of Fig. 44, Fig. 46 is a partial plan view of the tripping mechanism shown in Fig. 44, Fig. 47 is a sectional view taken substantially along the line 47—47 of Fig. 48, Fig. 48 is a sectional view taken substantially along the line 48—48 of Fig. 47, Fig. 49 is an elevational view, parts of the pusher mechanism being omitted, Fig. 50 is an enlarged plan view of one of the dam mechanisms shown in Figs. 41 and 42, Fig. 51 is a side elevational view of the mechanism shown in Fig. 50, Fig. 52 is a partial end view of the mechanism shown in Fig. 50, Fig. 53 is an enlarged elevational view of the dam adjusting control, Fig. 54 is a sectional view taken substantially along the line 54—54 of Fig. 53, Fig. 55 is a sectional view taken substantially along the line 55—55 of Fig. 53, Fig. 56 is a view taken substantially along the line 56—56 of Fig. 55, Fig. 57 is a sectional view taken along the line 57—57 of Fig. 56, Fig. 58 is a plan view of the dam for one of the conveyors, Fig. 59 is a side elevational view thereof, Fig. 60 is a front elevational view of the device shown in Fig. 58, Fig. 61 is an elevational view of a part of the hydraulic mechanism of the palleting machine, Fig. 62 is a plan view of the mechanism shown in Fig. 61, Fig. 63 is a diagram of the hydraulic circuit for actuating the various fluid motors, Fig. 64 is a diagram of the compressed air circuit for the various air-operated devices, Figs. 65 and 65a when considered together show the wiring diagram of the palleting machine, Fig. 66 is a schematic view showing the approximate location of various hydraulic circuit elements and electrical elements of the machine, Fig. 67 is a schematic diagram showing the location of the various limit switches and controls employed on the machine, and Fig. 68 is a single line diagram of the palleting machine.

Figs. 1 through 7 of the drawings diagrammatically illustrate the essential operation of the subject of this invention. Similar size packages 1 are supplied to the pallet loading machine over conveyors 2 and 3, the former delivering packages to one side of the machine and the latter delivering packages at right angles to the adjacent side thereof. The packages are to be stacked on a removable apron (not shown in Figs. 1 through 7) disposed above a pallet 4 vertically movable and arranged thereon in suitable patterns. The figures of the drawings show the packages stacked on the pallet in what is known as a "pattern of eight." The packages 1 are initially delivered to a position opposite the pallet 4 in groups of two, as indicated in the dotted line position thereof in Fig. 1. A dam or stop mechanism 5 is adjustably mounted along one side of the pallet 4 and aligns one edge of the group of two packages with the pallet. Mechanism is provided in the conveyor 2 for stopping the movement of packages thereon as soon as two have passed said mechanism, whereupon the movement of the packages being fed thereto is arrested. As soon as the arresting motion has taken place a pusher 6 moves the packages onto the apron above pallet 4 to the location indicated in Fig. 1.

Figure 2:
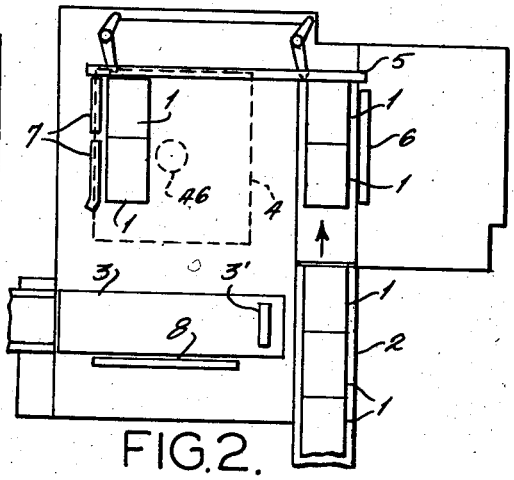
Figure 3:
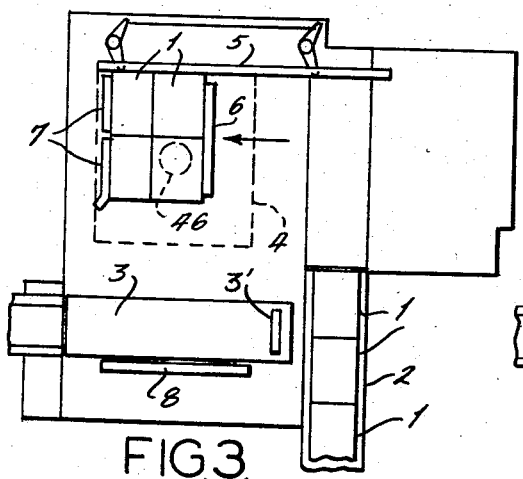
Figure 4:
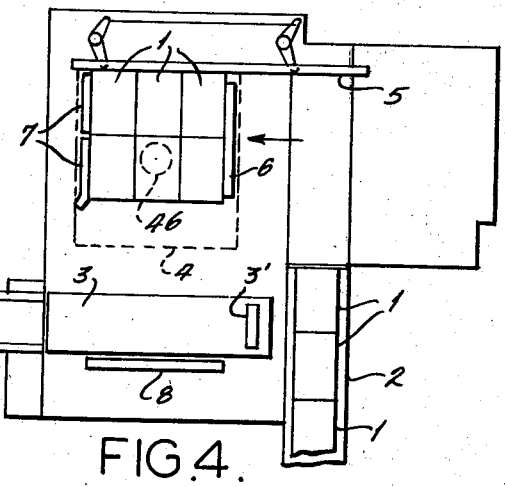
Figure 5:
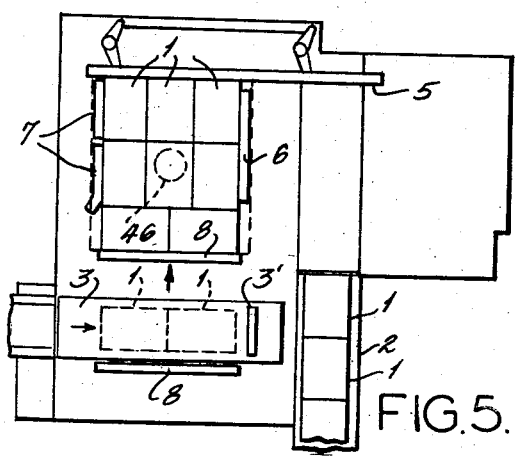
Figure 6:
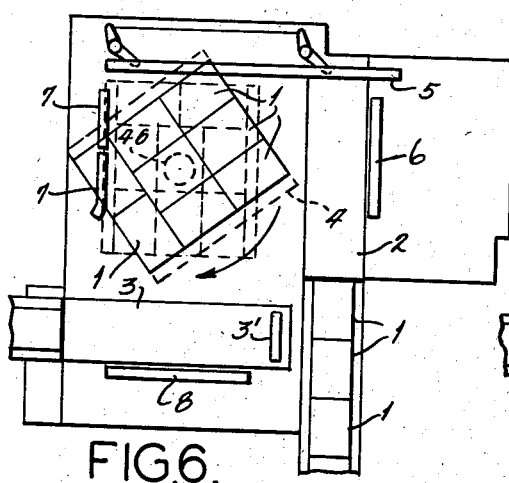

A stop or dam mechanism 7 is adjustably mounted on the side opposite the pusher 6 for the purpose of aligning the packages on the apron above pallet 4. After the packages have been pushed onto the apron, the pusher 6 is withdrawn and upon completion of its motion, two more packages are permitted to move ahead of pusher 6 by the release mechanism, as shown in Fig. 2, whereupon the pusher 6 is again energized and moves the packages onto the apron along side of the packages previously pushed thereon, as shown in Fig. 3. This operation is repeated until there are three sets of two packages each pushed onto the apron as illustrated in Fig. 4. This completes the loading operation by pusher 6.

When the above operation has been completed, pusher 6 is rendered inactive as well as conveyor 2 and the packages moving toward the machine over conveyor 3 are then permitted to move into position ahead of the second pusher 8. A stop or dam mechanism 3' is provided on the machine for arresting the motion of packages on the conveyor 3 and placing one end thereof in alignment with the packages previously stacked on the pallet 4. After the pusher 8 has completed its work by moving the packages from conveyor 3 onto the apron, it is held against the packages while they are being lowered. Thereafter, the table or support for the pallet is lowered a distance in excess of the height of one layer of packages, after which the pallet support is rotated 180° in a horizontal plane. The apron is then repositioned above the pallet and the pallet raised so that the top of the first layer of packages is just beneath the apron, after which the operation is repeated so that the layers of packages are arranged as shown in Fig. 7. The operation just described is repeated so that the packages derived from the conveyors 2 and 3 will overlie the packages previously loaded onto the pallet in interlocking relation. Several layers of packages are stacked on the pallet, whereupon it is removed from the machine and a new pallet located on the support therefor. Each of the layers of packages are interlocked so that the tendency of the stacks to tip will be prevented and the loaded pallet can then be handled by a "high lift" truck.

Figs. 8, 9 and 10 disclose elevational views of the operation shown in plan in Figs. 1 through 7. Fig. 8 shows pallet 4 located immediately below the apron to be later described in detail in this application. The packages are shown arranged on the apron in a "pattern of eight" as set forth above. Fig. 9 shows the apron withdrawn from under the patterned packages which have dropped onto the pallet 4 preparatory to being lowered by the hoist supporting the pallet for vertical movement.

Fig. 10 shows the apron repositioned above the pallet and the first layer of packages. However, the pallet has been rotated 180° in a horizontal plane during the change from the Fig. 9 position to that of Fig. 10. This will cause the packages of the second layer to overlap and bind the packages of the first layer when dropped thereon by withdrawal of the apron, as shown in Fig. 11. Fig. 12 shows the pallet 4 loaded with four layers of packages, the last two layers having been arranged in the same general manner as the first two. The pallet was reversely rotated 180° between the time the second and third layers were loaded and again reversely rotated between the time the third and fourth layers were loaded. This rotational motion produces a firm interlocked stack of packages loaded on pallet 4. The loaded pallet (Fig. 13) is now picked up by the "high lift" truck after it is discharged from the machine.

Fig. 14 illustrates a side elevational view of a machine that will perform the pallet loading operation above described. This machine is fabricated from suitable channel and bar stock having a pallet magazine and feeding section 9. A pallet loading section 10 is located along the side of the pallet magazine and feeding section, and superimposed above the pallet and loading section is a package classifying and arranging section 11. The pallet storage and loading sections are enclosed by suitable sheets of metal secured to the channel and bar stock frame 13.

The pallet magazine and feeding section is illustrated in greater detail in Figs. 15 through 29 and comprises a fluid motor 12 secured to the frame of the machine. The fluid motor is of the reciprocating piston type provided with a piston rod 14 to which is secured a platform 15. This platform is provided with guide rods 16 depending therefrom and received in cylindrical sleeves 17 suitably mounted in the frame 13. The sleeves 17 guide the movement of the platform 15. A stack of pallets 4 is arranged in magazine section 9 and held therein by means of a plurality of arms 18, which arms are supported on shafts 19 rotatably mounted in bearings 20 secured to the side elements of the frame 13. There are four arms 18 arranged in the lower part of section 9 and the pallets 4 are released, one at a time, onto the platform 15. The arms are normally located in slots provided in the pallets 4 and when rotated from the position shown in Figs. 17 and 20 to that shown in Figs. 18 and 21, they release one of the pallets. A fluid motor 21 of the double piston rod type is secured to frame 13 of the machine and is provided with a piston rod 22, one end of which mounts a bracket 23 to which is pivotally secured one end of an adjustable linkage 24, the other end of said linkage being pivotally secured to a lever 25 mounted on the shaft 19. A second lever 27 is secured to the shaft 19 and is provided with an anchor 27' (Figs. 26 and 27) for a spring 26, also anchored to the frame 13 of the machine. The second lever 27 is provided with a spindle 28 in the outboard end thereof. The spindle is rotatable in a bearing 28' secured to a lever 27 and has rollers 29 which are received in tracks 30, the tracks being elongated castings provided with grooves 31 and receiving rollers 29. The tracks 30 are secured to a guide plate 32 which locates the pallet 4 on platform 15. Both ends of the guide plate 32 are provided with tracks 30.

The cooperating arm 18 for the second set of tracks 30 is constructed similar to the one just described and is provided with lever 27 having rollers 29 associated therewith. This lever is carried by the shaft and an arm 25 is connected thereto which has the piston rod 22 associated therewith by adjustable linkage 24. A spring 26, anchored to the frame of the machine, is connected to lever 27. When the fluid motor 21 is energized, arms 18 are moved to the position illustrated in Fig. 21, whereupon the lowermost pallet 4 is permitted to drop onto the platform 15. After completion of this motion the arms 18 are again rotated so they will engage the slot in the succeeding pallet 4 immediately above the one released so as to support the unused pallets in the pallet magazine and feeding section. As soon as arms 18 have reengaged the pallet above the one released, the fluid motor 12 is energized, thus permitting the pallet on platform 15 to be lowered into position for transfer to the loading section 10 of the machine. The operation of the fluid motors 21 is controlled by reversing valve 21' secured to the lower part of platform 15. The valve 21' is actuated from a cam 16' cut in one of the guide rods 16 (Figs. 32 and 33). The cams 16' engage followers 17' extending through suitable slots cut in the guide sleeve 17 for engagement with cams 16'. The cam followers are secured in a frame 17" suitably connected to the plunger in the valve 21', which valve is connected to motor 21 by conduits 21". As the platform 15 is raised and lowered the cams 16' actuate followers 17' which transmits motion to the valve 21' for actuation thereof. Limit switches LS–19 and LS–20, which are operated in connection with the actuation of the guide plate 32, arms 18, and the conveyor mechanism next described, will be more particularly set forth later in this specification.

As the arms 18 are restored to their pallet holding position, the guide plate 32 locates the released pallet on the platform 15. The pallet having been lowered to the position shown in Fig. 17, it is then moved into the loading section of the machine, which is done by means of a pair of chain belts 33 (Figs. 15, 16 and 19) located in the base of the machine. Each of these chain belts is driven from an electrical motor 34 (Fig. 19) which drives a speed reducer 35 by means of a pair of belts 36. The output side of the speed reducer drives the jack shaft 37 by means of chains 35' passed about suitable sprockets on the shaft 37 and speed reducer 35. The shaft 37 is rotatably supported in bearings 38 secured to the frame 13 of the machine. The jack shaft 37 is provided with suitable sprockets 39 located outside of the pairs of bearings 38 about which chain belts 33 are passed. These chain belts are also in engagement with sprockets 40 secured to spindles 41 rotatably supported in bearings 42. The spindles 41 and bearings 42 are located adjacent the discharge conveyors 43 and 44 over which the loaded pallet is moved after discharge from the machine. One roller in each conveyor adjacent the machine is disposed above the plane of the other rollers and actuates limit switch LS–17 as the pallet passes thereover. The motor 34 is connected to a circuit including limit switch LS–17 to be hereinafter described and which controls the operation thereof in proper time and sequence with the operation of the machine.

The chain belts 33 transfer the pallet 4 to a pallet support 45 (Figs. 34–40) which support is moved vertically in section 11 of the machine by means of a fluid motor or hoist 46 suitably mounted in the frame 13 thereof. This support is capable of rotating relative to fluid motor 46 by means of a plurality of rollers 47 which are rotatably mounted on brackets 48 secured to a frame 49 carried by a piston rod (not shown) of the fluid motor 46. The support 45 is also suitably journaled in the frame 49. The frame 49 is guided for vertical movement in section 11 by means of slide bearings 50 cooperating with guide bars 51 mounted on the sides of the chamber of loading section 11. Limit switches LS–15, LS–16, LS–21, LS–22 and LS–23 (Fig. 68) are located along guide bar 51 for actuation by slide bearing 50. The function of these switches will be explained in connection with the circuit in which they are connected.

The pallet support 45 has a depending spindle 52 to which a gear 53 is secured. The spindle 52 is suitably journaled in the frame 49 for permitting pallet support 45 to rotate thereabout and on rollers 47. A gear 53 meshes with a rack 54 slidably received in slide bearing 55 rockably mounted on the spindle 52. The rack 54 has an adjustable coupling 56 secured thereto. Also, it is connected to the outer end of crank 57 rigidly mounted on a shaft 58 constituting the output side of a speed reducer 59 mounted on the frame 49. The input side of the speed reducer comprises a shaft 60 rotatably supported in pillow block bearings 61 also mounted on frame 49. A pulley 62 is secured to the shaft 60 and is connected to the pulley 63 secured to the armature shaft of motor 64 by belt 65. The motor is adjustably mounted on the frame 49. Limit switches LS–13 and LS–14 are secured to the frame 49 and control the stopping of motor 64 when pallet support 45 has rotated the necessary 180°. The switches are actuated by the coupling 56 or crank 57 and a stop member 66 limits the motion of the crank and rack. The slide bearing is rocked about spindle 52 constituting an axis for the intermittent reversing movement of the pallet support 45. The rotation of support 45 and the vertical movement of frame 49 is controlled by suitable electrical circuits to be subsequently described.

After the pallet 4 has been loaded with the required number of interlocked packages 1, the pallet will be in its lowermost position, whereupon the loaded pallet 4 will engage lever 67 pivotally mounted in the frame 13 of the machine. This lever will be depressed by the loaded pallet 4 as it descends, thus permitting it to be moved to the conveyors 43 and 44 because the roller 68 provides support for the loaded pallet when moving from chain belt 33 onto conveyors 43 and 44. After the loaded pallet has been discharged from the machine, the lever 67 will assume the position shown in Figs. 34 and 35 wherein it constitutes a stop for another pallet 4 derived from the pallet magazine and feeding section 9. The two functions of lever 67 are obtained by having springs 72 (Figs. 35 and 37) maintain the roller 68 above the horizontal plane of the conveyor 33 to stop an empty pallet advancing onto the latter conveyor. In stopping the empty conveyor, the lever 67 can move back on the spring element nearest the discharge conveyors 43 and 44 (clockwise as viewed in Fig. 35 about the pivot 69), so that the roller 68 yields or backs off its neutral position. This yield allows the empty pallet to advance its full distance on conveyor 33, but also allows the roller 68 to move back to neutral as soon as the pallet has moved upwardly beyond the reach of the roller. When a loaded pallet descends, the roller 68 is underneath the pallet, because of this yieldability of the lever 67, and may then act as a support for the pallet (Fig. 14) as the latter moves onto the conveyors 43 and 44. The cycle of movement of levers 67 is completed when the loaded pallet has cleared rollers 68 and the neutral position has been regained thereby.

The lever 67 (Figs. 35–37) is secured to a shaft 69 rockably supported in suitable bearings forming part of a bracket 70 fastened to frame 13. The levers 67 are actually arranged in pairs, the roller 68 being disposed therebetween. A lever 71 is pinned to the shaft 69 and is in engagement with springs 72 retained in holders 73 mounted in brackets 70. The lever 71 has a spherical contact member for engaging a suitable bushing in the spring and the springs 72 normally hold lever 67 in neutral position. There is a lever 67 for each of the conveyors 43 and 44. Limit switches LS–18 and LS–24 are supported on frame 13 for actuation by pads on the levers 67. The function of these switches will be explained in the description of the operation of the machine in connection with the circuit operation thereof.

The conveyors 2 and 3 described in Figs. 1 through 7 terminate in the pallet classifying and arranging section 11, conveyor 3 being shown in Fig. 41 and the companion conveyor 2 shown in Fig. 42. The space requirements for a proper illustration of this plan arrangement necessitate disclosing two views thereof.

After delivery to the section 11 from conveyors 2 and 3 of the palleting machine, the packages are then placed on an apron 74 which consists of a plurality of rollers 75. The ends of these rollers are rotatably arranged in chains 76, the rollers being moved from under the packages thereon in order that the packages may drop onto the pallet 4 located immediately below the rollers. The chains are in engagement with sprockets 78 secured to spindles 79 rotatably supported in the frame 13 of the machine. One of the spindles 79 is provided with sprockets 80 (Fig. 43) and connected to sprocket 81 secured to a jack shaft 82 rotatably mounted in the frame 13. A chain belt 83 passes around sprockets 80 and 81 so that one may be driven from the other. The jack shaft 82 has a sprocket 84 (Figs. 61 and 67) thereon which is connected to a sprocket 85 by means of a chain belt 86. The sprocket 85 is fastened to shaft 87 rotatably mounted in suitable bearings 88 secured to the frame 13 of the machine. The shaft 87 has a gear 89 thereon that meshes with a gear rack 90 mounted in a suitable bearing which is also slidably rockable about shaft 87 as an axis. The rack 90 is connected to a crank arm 91, an adjustable coupling 92' being interposed between the crank arm and the gear rack. The crank arm is secured to a shaft 92 rotatably mounted in bearings 93 on the frame 13 of the machine. A gear 94 is mounted on shaft 92 and meshes with a gear rack 95 suitably held in engagement therewith. The gear rack 95 is connected to the piston rod 96 of a reversible fluid motor 97 secured to the frame 13. Limit switches LS–11 and LS–12 are operatively associated with the operation of the rack, arresting the motion of the apron and other devices under certain operating conditions, as will be more particularly described in connection with the description of the operation of the machine. Operation of fluid motor 97 will, therefore, reversely move apron 74.

The conveyors 2 and 3 present packages 1 to the classifying and arranging section to be loaded on the apron mechanism. The conveyor 3 (Figs. 41, 44, 45, 46–48) is provided with a portion that is a part of the palleting machine and operated as a part thereof. This portion of the conveyor 3 comprises a frame 98 arranged in a bracket 99 secured to the machine frame 13, which portion has a plurality of rollers 100 rotatably mounted therein, each having a sprocket gear 101, all driven in unison by means of a chain belt 102 in engagement with each gear, an idler sprocket gear 103 being in engagement therewith for maintaining the chain belt taut. The frame 98 pivots or tilts about the outermost roller 100 so that the plane of all of the rollers may be disposed at an angle to the horizontal and parallel to, or at an angle to the plane of the companion conveyor. The function of this tiltable frame is to arrest the movement of packages at predetermined times in the operation of the machine. The tilting is done by means of a pressure fluid-operated tilting mechanism 104, more fully described in connection with Fig. 49 and operated at said predetermined times.

The tiltable portion 98 discharges packages onto the rigid portion 105 of the conveyor 3. This part of the conveyor comprises a series of rollers 106, some of which have a sprocket gear 107 on one end thereof, all sprocketed rollers being driven in unison by a chain belt 108. An adjustable idler gear 109 engages chain belt 108 in order to maintain same taut.

The driven rollers in each of the conveyor portions are operated from a motor 110 provided with a speed reducer 111. The output sprocket gear 112 is connected by a chain belt 113 to a sprocket gear 114 secured to a jack shaft 115 rotatably mounted in the frame 13 of the machine. The jack shaft has a sprocket gear 116 thereon about which chain 108 passes to drive the rollers. The jack shaft is provided with another sprocket gear 117 that drives a sprocket gear 118 mounted on the spindle of the outermost roller 100 by means of a chain belt 118'. By this means the rollers 100 and 106 are driven in unison. Disposed between some of the rollers 106 are pivoted levers 119 suitably mounted in the frame of conveyor portion 105. These levers are associated with pivoted levers 120 and 121. The lever 121 is part of limit switch LS-1. The second lever 120 actuates limit switch LS-4 (Fig. 44). A limit switch LS-3 (Figs. 41 and 65) is mounted at the end of conveyor portion 105. The function of each of these switches will be described in connection with the description of the operation of the machine.

The conveyor mechanism 2 (Fig. 49) is constructed similar to conveyor 3 and comprises a tiltable portion 122 having a plurality of rollers 123 rotatably mounted therein and driven in unison in the same manner as in the corresponding tiltable device of conveyor 3. The packages presented to the tiltable portion 122 are discharged onto a rigid conveyor portion 124 having rollers 125 rotatably mounted therein. These rollers are provided with gears 126 and are driven in unison by a chain belt 127 passing around the sprocket gears.

An electric motor 128 constitutes the source of power for driving the rollers 123 and 125. The motor is provided with a speed reducer 129, output sprocket gear 130 thereof being connected by chain belt 131 to a sprocket gear mounted on shaft 132. This shaft has several sprocket gears arranged as shown on the shaft 115 in Fig. 45. A chain belt 133 passing around one of the sprocket gears on shaft 132 drives the rollers 123, and chain belt 127 passes around another gear on shaft 132, supplying power to rollers 125. A chain belt tightener 134 cooperates with chain belt 127 for keeping it taut.

The tiltable portion 122 of conveyor 2 is pivoted about the axis of the outermost roller by means of a fluid motor 135, one end of which is pivoted to the frame 13 of the machine. The piston rod 136 is connected to one arm of bellcrank 137 and the other arm is operative on a suitable bracket secured to one end of the tiltable portion of conveyor 2. The tiltable portion or frame 98 of conveyor 3 is actuated by a similar mechanism.

Disposed between some of the rollers of the rigid conveyor portion 124 of conveyor 2 are pivoted levers 138 and 139 for actuating limit switches LS-6 and LS-9 operated in the same manner as limit switches LS-1 and LS-4, performing the identical function. A limit switch LS-7 (Fig. 49) is located adjacent the end of the conveyor 2 and performs the same function as limit switch LS-3 at the end of conveyor 3 (Figs. 41 and 46).

It has been pointed out above that pushers 8 and 6 move the packages located on the adjoining conveyor sections 105 and 124, respectively, onto apron 74. The packages delivered to the conveyor section 105 are engaged by pusher 8 (Figs. 41 and 43) which comprises a depending member 140 to which piston rod 141 is suitably secured. This rod is connected to the usual piston (not shown) in fluid motor 142 mounted in the frame 13 of the machine. The member 140 is movable along a pair of guide rods 143 extending therethrough and appropriately anchored to the machine frame 13. This member is provided with sleeve bearings through which rods 143 slide, thus keeping the motion of the arm at right angles to conveyor 3. Limit switches LS-2, LS-5 and LS-10 (Fig. 65) are associated with the operation of the pusher 8 and the fluid motor. Pusher 6 is actuated by fluid motor 144 having a piston rod 145 secured to the pusher. One end of guide rods 146 are anchored to supports 147 mounted on a suitable bracket secured to the frame 13. The other ends of the guide rods are held in the frame of section 11 of the machine. Sleeve bearings 148 are associated with pusher 6 and guide rods 146 extend therethrough, thus guiding the movement of the outer end of the pusher 6 as it is moved by fluid motor 144. Limit switches LS-8 and LS-25 (Figs. 15, 42 and 65) are associated with the operation of pusher 6 and the function of these switches, as well as LS-2, LS-5 and LS-10, will be defined in connection with the description of operation of the machine.

The construction and operation of dam 5 is illustrated in Figs. 50, 51 and 52. This dam comprises an elongated channel member 149 pivoted to the frame 13 of the machine. Pins 150 are rotatably received in bearings 151 secured to frame 13. The pins have bellcranks 152 secured thereto at one end, one end of each bellcrank being pivoted to the channel member or dam 5 by means of pins 153. The other end of each bellcrank 152 is pivoted to a rod 154 extending therebetween so that the bellcranks will move in unison. The right hand pin 150, as viewed in Figs. 50 and 51, has a bellcrank 155, one end of which is pivoted to a pin 155' and the other end pivoted to an adjustable rod 156 also connected to piston rod 157 of fluid motor 158 secured to the machine frame 13. A limit switch LS-7 is secured to the channel member 149. The lower end of the other pin 150 is provided with an arm 161 which connects with pin 153 in order to furnish a support therefor. The dam 5 will, therefore, move in a parallel plane relative to apron 74 when fluid motor 158 has pressure fluid supplied thereto. The dam 5 aligns one side or edge of packages 1 with the pallet 4 so that they will be properly stacked thereon by the machine which is adjustable for different size packages. The position of dam 5 is controlled by control switch disclosed in Figs. 56 and 57, and is connected to fluid motor 158 through piston 157, bracket arm 160 and connecting rod 159. The side of the package which is at right angles to those aligned by dam 5 is aligned by dam or stop mechanism 7, two thereof being particularly illustrated in Figs. 53, 54 and 55, the control switches, construction and organization thereof being disclosed in Figs. 56 and 57. The controls locate the face of the dam against which the packages abut adjacent an edge of the pallet so that packages will rest squarely on the pallet and in alignment with the edges thereof.

The dams 7 (Fig. 54) each consists of an elongated member 162, one on the entering side for the packages having an outwardly flared portion 163 for directing any misaligned packages on conveyor 105. Each member 162 is moved by fluid motor 164 secured to the machine frame. This motor has a piston rod 165 connected to the elongated member 162, opposite ends of the elongated member having guide rods 166 connected thereto and received in slide bearings 167 mounted in the frame 13. The guide rods cause the dams 7 to move without binding or twisting out of aligned relation with the apron 74.

The opposite ends of motor 164 have conduits 168 connected thereto and leading to solenoid-actuated reversing valves 169. These valves (Figs. 53 and 55) are connected in parallel relation by means of conduits 170, the conduits leading to a suitable source of pressure fluid (not shown).

Associated with each of the dams 7 (Figs. 54 and 55) is a selector switch 171, the plunger 171' of which is secured to the dam and moved thereby. The connections for switches 171 have been shown in the electrical diagram and will be pointed out presently.

Each selector switch 171 (Figs. 56 and 57) comprises a housing 175 in which the plunger 171' is slidably received. A longitudinal surface groove 176 is cut in the plunger 171' and actuates a suitable switch 177'. A head 176' is formed on plunger 171' which actuates any one of a series of switches 177 mounted on three sides of the plunger. When plunger head 176' is moved relative to switches 177, the dams 7 are correctly located with respect to the apron 74 and pallet 4.

A dam 3' located at the end of conveyor 3, shown generally in Figs. 41, 42 and 43 and more specifically in Figs. 58, 59 and 60, comprises a barrier member 178 to which the piston rod 179 of fluid motor 180 is secured. The barrier member 178 is provided with bars 181 at the sides thereof acting as slides received in slideways 182 secured to the machine frame. These slideways are preferably bars which are suitably milled to receive bars 181 in order that the barrier member 178 may be moved in a straight line. The fluid motor 180 is mounted on the machine frame, pressure fluid being supplied to the ends of the motor by conduits 183. These conduits are also connected to a solenoid actuated reversing valve 184. A switch actuator 184' is pivotally mounted in the barrier member for arresting the rotative motion of the conveyor 3. A switch mechanism 185 (Fig. 59) controls the operation of reversing valve 184. This switch 185 has a plunger 186 directly secured to the lower portion of the barrier member 178 and operates in the same manner as the switch shown in Figs. 56 and 57.

The pressure fluid supply for the hydraulically operated devices (Figs. 61, 62 and 63) is derived from two pumps, namely, a high pressure pump 187 and a low pressure high volume pump 188, which pumps are driven by a double-ended motor 189. These pumps have pulleys 190 and 191, respectively, which are connected by means of belts 192 and 193 to pulleys 194 and 195, respectively, on motor 189. Each of the pumps derives fluid from a sump 196 located in the base of the machine, suitable filters 197 schematically illustrated being provided for each pump. Pump 187 has a valve 199 connected thereto for limiting the pressure to be supplied by it, and pump 188 may be provided with a relief valve 198 and pump 187 provided with a relief valve 200 associated therewith.

Fig. 63 shows the hydraulic circuit for the machine and also the part of the circuit which is operated by the high pressure pump 187. The high pressure conduit is indicated by the full line and shows a conduit 201 leading from the pump 187 to a solenoid-operated reversing valve 202. This valve controls the operation of fluid motor 97 for operating the apron 74 and conduits 203 connect the valve 202 with the fluid motor 97.

The low pressure pump 188 supplies pressure fluid to the hoist or motor 46. A conduit 204, shown in broken lines, conducts pressure fluid from the pump to the reversing valve 205, from which the fluid is directed to the hoist or motor 46 by conduit 213. Pressure fluid from pump 188 is also directed in a parallel circuit to motors 158, 164, 164, 180 and 142, respectively, through conduit 206 after first passing through valve 205. The conduit 206 branches out to the several motors after passing through the respective reversing valves 207, 169, 169, 184 and 208 for each of the several motors.

The exhaust pressure fluid from apron motor 97 is connected into the conduit 206 and a relief check valve 209 is also connected in the conduit. It is assumed that the discharge pressure of pump 187 is maintained at 300 pounds per square inch, and that the low pressure pump 188 discharges 75 pounds per square inch. The check valve 209 is set at 75 so that the pressure in conduit 206 will not exceed 75 pounds per square inch, regardless of the pressure of the discharge fluid from motor 97. The discharge fluid from each of the motors 158, 164, 164, 180 and 46 is returned to the sump 197 through conduit 210 and includes the discharge from relief valve 199. Two conduits 210 and 211 conduct pressure from the hoist motor 46 after passing through valve 205.

The air circuit for the pneumatic devices is illustrated in Fig. 64 and shows a conduit 214 connected to any suitable source of air under pressure. A combination filter and pressure regulator valve 215 is inserted in this line. The conduit 214 has branches 216, 217, 218, 219 and 220, respectively, leading therefrom and connecting with motors 12, 21, 21, 142, 135, 135 and 144, respectively. Inserted in the respective branch conduits are solenoid operated reversing valves 221, 222, 223, 224, 225 and 208 which control the admission of air under pressure to the motors 12, 21, 21, 142, 135, 135 and 144, respectively. The foregoing branch conduits connect one end of the several motors to the supply conduit 214, and conduits 226, 227, 228, 229 and 230, respectively, shown in broken lines, connect the other ends of the motors to the respective reversing valves. The exhaust from these motors is led directly by the respective valves to atmosphere.

The platform 15 (Figs. 16, 30 and 31) in the pallet storage and feeding space 16, has a switch actuating member 231 pivoted thereto by means of a pivot pin 232 secured to the platform 15. A spring 233 is anchored at one end to the platform 15 and is connected at its opposite end to a bracket 234 associated with the member 231. The spring normally holds member 231 in the raised position shown in Fig. 31. This mechanism controls the operation of limit switch LS-20, whose function will be described in connection with the operation of the machine.

The position of pallet 4 under apron 74 is controlled by a light-sensitive cell 235 (Fig. 41) which cell is located on the frame 13 of the machine. A mirror 236 is located under apron 74 on the opposite side of the machine and secured to frame 13. A light source 237 is located on the same side of the machine frame with cell 235, but spaced therefrom. The light from the source 237 is directed toward mirror 236 which then reflects the light so it strikes the sensitive cell 235. The interruption of the light beam controls the position of the pallet support 45, as will be more fully explained in connection with the circuit operation.

The hydraulic system (Fig. 63) partly described above, may now be appreciated to consist of two separate and distinct circuits, one being a low pressure high volume circuit which operates the hoist motor 46, together with various other fluid motors; and the other being a relatively low volume high pressure system for operating the motor 97 for the apron 74. The first mentioned system also provides the source of pressure fluid for controlling the adjustable dams surrounding the apron. The low pressure system consists of a pump 188 which feeds through a valve 205 directly into the hoist motor 46. When one side of the valve is energized, pump pressure is directed into the hoist motor to lift the pallet to the required position, while the opposite side permits hydraulic fluid to flow from the hoist into sump 196, thus permitting the lowering of the hoist. In the latter position the pump is connected directly to the sump through the second cylinder port on the valve, the valve employed in this particular instance being known as the "open center" type of valve. Normally, this type of valve would be used to operate a hydraulic cylinder in the opposite direction, but in this particular application the hoist is allowed to descend by means of gravity so that the external pressure is unnecessary. By reason of the "open center" construction of the valve, the pump is subjected to pressure only at such times as necessary, namely, when the hoist is to be raised.

The high pressure system is arranged (Fig. 63) so that the pump 187 discharges through the "open center" type valve 202 into a check valve 199 and thence back to the sump 196. Most of the time this pump is unloaded, thus minimizing power waste. A relief valve is connected externally of the pump and also functions as a safety valve. The pressure of pump 187 is selectively directed into either end of the apron driving motor 97. In the neutral position of the valve the discharge of the pump supplies pilot pressure for valve 205, as well as for the adjustable dams. This pressure is maintained at about 75 pounds per square inch by reason of check valve 209. Since some of this pressure is derived from the discharge valve 205, any blocking of the exhaust port of this valve will interrupt this part of the circuit and, therefore, when valve 205 is energized and the exhaust port momentarily closed, the pressure at this point in the system drops. If this source were then used to supply pilot pressure to valve 205, it would become stalled in the pressure-operated position and further adjustment thereof would be impossible. Therefore, the pilot pressure through conduit 206 (Figs. 61 and 63) for this valve is taken directly from the low pressure side of the check valve 209 so that positive operation is assured. This low pressure is also used to supply the several control valves and associated motors for the dams, to eliminate the need for more substantial equipment.

In initiating operation of the machine, air pressure must first be supplied thereto in order to actuate a pressure switch 238. If air pressure is properly available, operation of this switch will energize the electrical circuit for the machine so that power can be applied thereto. Upon the closing of warm-up switch 239, power is then applied to the photoelectric circuit and to motor 189 for the fluid pumps 187 and 188. If the switch 241, which controls the manual or automatic operation of the machine, is in automatic position, voltage will be supplied to switch 242 that controls the running of the several motors. After the photoelectric unit is heated and the pump motor 189 has reached normal speed, the switch 242 will be closed, thus energizing the circuit to the starter LR-1. Upon energization of this starter, the starter LR-2 is energized, thus placing that portion of the circuit in condition for operation. Since these two starters are interlocked, an overload on either of them will disconnect the other and thus stop the machine. A plurality of safety stop switches 243 are interconnected with switches 239 and 242, whereby the circuit leading to all of the starters may be interrupted to stop the motors connected thereto.

In the interest of simplifying the description of the circuit diagrams, the principal circuits will be described and only brief reference made to the remainder of the circuits. Accordingly, attention will now be directed to Figs. 65 and 65a.

With a few exceptions, which will be discussed below, most of the operating components of this machine are standard items which are used in the normal manner. This applies to the various motors, motor starters, limit switches and allied equipment. The exceptions to the above are as follows:

The relays CR-4 and CR-5 are the so-called "memory" type, requiring one coil to be energized to set the relay, and an additional coil to drop it out. They require only momentary energization to either make or release, hence are not affected by interruptions in voltage such as when the machine is turned off, or a power failure occurs. These relays are mechanically held in place once the circuit is established and are used where an uncalled for change in position would seriously impair the proper cycling of the machine.

The relays SR-1 and SR-2 are "stepping" or counting relays consisting of two coils, one for setting the count and the other for resetting or restoring the count to zero. With each impulse to the setting coil the contacts are advanced one position, where they are held by a pawl, engaging the indexing head. Each position establishes a separate circuit so that selecting the correct contacts, an operation can be made to occur after the desired count has been made. Energizing the reset coil releases the pawl, allowing the indexing head and the contacts to return to the "zero" position, so that a new series of counts may then be made. One of these relays carries two sets of contacts so that two separate circuits may be controlled on each count.

The photoelectric cell unit is a conventional self-contained photo electric control providing six volts for the operation of the light source, and containing the necessary amplifier for the actual sensitive cell.

This machine is designed to operate from a 220 volt power source, and all of the motors employed are wired for this voltage. However, all of the control circuits are designed for 110 volt operation, hence a step-down transformer T is provided for supplying power for these circuits. The particular transformer selected is rated at 500 volt-amperes and supplies approximately 4 amperes to the various relays, motor starters, valves and other units.

The air cylinders 12, 21, 135, 142 and 144 are equipped with self-contained, solenoid-controlled, pilot-operated valves. The pilot valves are of known type, having a small pilot hole closed on the inside by the presence of a rubber cap. This cap is withdrawn when the solenoid directly below it is energized and a small amount of air from the supply line is allowed to escape. The flow of this escaping air through the valve picks up the master piston and shifts it to reverse the air flow into the cylinder. When the opposite solenoid is energized, the same process occurs in the opposite direction and the cylinder movement is reversed. Once the master piston is shifted, it will remain in that position until the other solenoid is actuated, hence only a momentary electrical signal is necessary to move the air cylinder through its entire stroke. The low pressure pump 188 is a gear-type pump, belt driven from the motor 189 at a speed of 1800 r.p.m. This pump is equipped with a built-in relief valve which is non-adjustable. This valve is intended to be used solely as a safety device and will not handle the entire output of the pump for any appreciable time without overheating.

The high pressure pump 187 is a vane-type pump capable of producing pressure. It is also belt driven but at a speed of only 1200 r.p.m. This pump does not contain its own relief valve but is dependent upon an external valve 199 connected at the output of the pump and is manually set to the desired relieving pressure. This valve is of a balanced spool-type of construction to minimize the heat lost through it when the relieving pressure is exceeded. It contains provisions for mounting a pressure gauge and should be adjusted for releasing at the desired pressure.

With the exception of fluid motor 97 for the apron 74, the system contains a check valve 209 similar to the relief valve described above, except it does not have the balanced piston-type of construction and is non-adjustable. This unit contains a built-in spring which is set to provide a back pressure of a desired low order in the return line at all times. This check valve has a pilot pressure line 206 connected to a solenoid-controlled, pilot-operated, four-way hydraulic valve 205. This valve 205 (Fig. 63) consists of a main body containing the necessary ports to which the external piping connections are made, and a sliding spool for establishing the desired cross connections within the valve. The spool, in turn, has three positions of stability so that three different connection arrangements may be obtained.

In the center position the incoming pressure fluid from line 204 is routed directly to the return line 210 to the tank 196, and the two ports leading to the hoist cylinder 46 are blocked shut. This center or deenergized position allows the pump to be unloaded so that the only pressure existing in the line is that due to pipe friction and other line losses. Also, the associated hydraulic cylinder is prevented from moving regardless of the external load.

When the spool is thrown to one end of its travel, the incoming pressure fluid is connected to one side of the hoist cylinder 46 being controlled, while the other side is returned to the tank line 211 and 210. Conversely, when the spool is moved in the opposite direction, these connections are reversed and the cylinder 46 will move in the opposite direction.

From the above, it may be seen that the only time the pump 188 is subjected to pressure is when the main spool of valve 205 is thrown in such a position as to connect the pump into either end of the cylinder 46. At all other times the pump 188 is discharging directly to the tank 196 and a minimum amount of power is wasted.

The position of the spool in this valve is controlled by means of separate external pressure in the pilot line 206 which acts on a small pilot piston to actually move the main valve spool. This pilot piston, together with its two controlling solenoids, is mounted in the end of the valve assembly. With the solenoids de-energized both sides of the pilot piston are connected to the return line 210 to the tank 196 and no hydraulic pressure is exerted on the pilot piston. Consequently, the main spool is retained in its neutral position by means of a centering spring located in the opposite end cap. When one solenoid is energized, it opens a small auxiliary valve which directs the pilot pressure into one end of the pilot piston. This, in turn, causes the main spool to shift against the centering spring until the various ports of the valve are covered and uncovered in the appropriate manner for this position. The solenoid must remain energized to hold the main spool in this position. Releasing the solenoid provides a discharge path for the fluid accumulated in the pilot piston, and the centering spring will restore the main spool to its neutral position. The exhaust path is completely self-contained within the valve 205 so that the drainage from the pilot section returns through the common discharge line 210 back to the tank 196. This type of construction is known as an "internally drained valve."

In addition to the hydraulic functions described above, there are electrical indications which the valve 205 must also provide. Consequently, one of the solenoids operates an auxiliary switch (not shown) mounted on its cover to indicate whether or not this unit is energized.

The valve 202 for the apron cylinder 97 and connected thereto by lines 203, is very similar to the one described above, except that it contains a slight modification in the draining of the pilot piston. As mentioned above, valve 205 drains directly into the return line 210 to the tank 196. However, this is not practical on valve 202 since this valve does not discharge directly to the tank and is subjected to back pressure upon its exhaust port. If valve 202 were internally drained, this pressure would be connected to both sides of the pilot piston when in the de-energized position. Since the pilot piston has a connecting rod on one side, the resulting force is not equal on both sides of the piston. This condition is not apparent when there is no pressure against the pilot piston, but where the back pressure is present a definite unbalance would be brought about.

In order to prevent this condition the pilot piston is externally drained through a separate line 202' directly to the tank 196, so that in the deenergized position this piston is surrounded by fluid under practically zero pressure. Electrically, this valve is constructed similarly to that described above, except that both solenoids are arranged to activate limit switches.

The valves 207, 169, 169 and 184 for the respective motors 158, 164, 164 and 180 are not pilot controlled but are actuated directly from the solenoids located at either end of the assembly. They are considerably smaller than the two valves described above and do not require the external pilot pressure for successful operation. Their internal construction is similar to valves 205 and 202, except that in the center, or neutral position, the valve is not "open center" but "closed center." This means that instead of returning the pressure fluid directly to the tank, both the pressure line and the tank line are blocked shut, as well as the cylinder ports.

*Hydraulic system*

The hydraulic system (Fig. 63) is divided into two separate and distinct units—one a low pressure, high volume system required to operate the main hoist 46, and the other a relatively low volume, high pressure system for controlling the apron motor 97. In addition, this second arrangement provides the power for controlling the adjustable dams 5, 7, 7 and 3' surrounding the apron 74. These two circuits, hereafter referred to as the "low pressure" and the "high pressure" systems are described in detail as follows:

The low pressure system is a straight-forward arrangement consisting of pump 188 feeding directly through valve 205 to the main hoist motor cylinder 46. When one side of the valve is energized, pump pressure is directed into the cylinder 46 to lift the pallet 4 to its required position, while the opposite side permits the fluid to flow from the cylinder back into the tank 196, thus lowering the pallet. In this latter position the pump is connected directly to the tank 196 through the second cylinder port on the valve 205. This port would normally be used to drive a hydraulic cylinder in the opposite direction, but in this application the pallet 4 is allowed to descend by means of gravity so that external pressure is unnecessary. Due to this arrangement, and the "open center" construction of the valve, the pump is only subjected to pressure when it is needed, that is, when the elevator is to be raised. The relief valve, which is a built-in feature of the pump, is only a safety device and under normal conditions should never be operated.

The high pressure system is arranged so that pump 187 discharges through the "open center" of valve 202 into check valve 209 and hence back to the tank 196. Consequently, this pump also is "unloaded" most of the time and wasted power is held to a minimum. Relief valve 199 is piped externally to this pump but also serves only as a safety feature and is not normally used. The pressure from pump 187 may be directed into either end of the apron driving cylinder 97, depending upon the position of valve 202. In the neutral position, however, the discharge of this pump serves to supply pilot pressure for valve 205 as well as the four adjustable dams. This pressure is maintained at about 75 pounds per square inch by the resistance of check valve 209. Since this pressure supply is the result of the discharge from valve 202, any blocking of the exhaust port on this valve will interrupt this part of the circuit. Consequently, when valve 202 is energized and the exhaust port momentarily closed as the valve spool moves from one port to another, the pressure at this point in the system drops. If this source were then used to supply pilot pressure to valve 205, the valve would become stalled in a partially thrown position and further movement of the valve spool would be impossible. Therefore, the pilot pressure for this valve is taken directly from the pump so that positive operation is assured. This pressure is not used to supply the dams and the other control valves; however, as the pressure can reach full operating range and high pressure equipment would be required.

*Operation*

In order to operate the machine, air pressure must first be supplied, as described. The presence of pressure at the machine will close the switch 238 (Fig. 65) so that controlling voltage is applied to the "warm-up" button 239. Depressing this button 239 will then energize the pump motor 189 and also provide power to the photoelectric controller. Furthermore, if the automatic position switch is in the automatic position shown, voltage will also be applied to the starting switch 242. After the photoelectric unit is warmed up, this switch 242 may then be operated to energize starter LR-1. LR-1 in turn picks up starter LR-2 which has a holding circuit around the switch 242, thus energizing the rest of the control circuits. Since the starters LR-1 and LR-2 are interlocked, an overload on either one will drop the other out and stop the machine. The "stop" switches 243 function in the manner of breaking the circuit to all starters and then dropping them out.

The warm-up switch 239, as above noted, controls the starting of the motor for the hydraulic pumps and the photoelectric controller and the run switch 242 energize the remainder of the machine, thus placing it in condition for operation. The switches 246, relating to the feed-on and feed-off conditions, control the spacers 98 and 122 which are the structures located in conveyors 2 and 3 and may be tilted out of the line of travel thereof. The feed-on switch causes the spacers to rise so that packages may pass over the conveyor, and the feed-off switch causes the spacers to drop, thereby preventing the entrance of packages to the machine. Under normal operation, the spacers are depressed and, therefore, no packages will be fed into the machine. Switches 245 (three being shown in Fig. 65a) regulate the stacking height of the packages on the pallet. The switch marked "1" selects the desired stacking height, which height is preset in terms of inches and applies to all sizes of packages. A small package will result in more layers being deposited on a given pallet for the stacking of packages on the same over-all height. The switch marked "2" selects an alternate height as well as the switch marked "3." The height controlled by switch "3" is the preferred selection and the machine will automatically operate to this height whenever it is started unless one of the other two switches 245 has been closed.

Assuming that the machine is completely empty and the operation to start is by supplying packages over conveyor 3, the fluid motor 135 for spacer 98 is energized through circuit LS–4a and CR–1b in parallel with circuit LS–2b and LS–3a, together with the parallel circuit LS–1a and CR–1c. These circuits are LS–2 and contact 3a on limit switch made by tripping LS–1. A package passing over conveyor portion 105 breaks the circuit to motor 135 for spacer 98, causing it to lower and stop the flow of packages when contact 1a of limit switch LS–1 is tripped. This switch is open since contact 1c of control relay CR–1 is deenergized. The first package continues its motion and after it clears contact 1a on limit switch LS–1, the circuit is completed to motor 135 for spacer 98, thus causing it to rise and allowing the succeeding package to pass over the conveyor into the machine. When the first package is moving into position to be loaded on apron 74, it trips contact 3b of limit switch LS–3, indicating its presence at this point. Upon entering the machine the second package again trips contact 1a of limit switch LS–1 and lowers the spacer 98 as previously described. When the second package is in the correct position for loading, it operates limit switch LS–4. This second package may or may not remain on switch LS–1, depending upon its length. However, motor 135 for spacer 98 remains deenergized since contact 3a of limit switch LS–3 and contact 4a of limit switch LS–4 are held in open position by reason of the presence of the two packages. When contact 3b of limit switch LS–3 and contact 4b of limit switch LS–4 are tripped, both packages are in the correct position. When this condition exists, the fluid motor 142 for pusher 8 operates to load the packages onto apron 74. As soon as motor 142 leaves its normal position, it releases contact 2b of limit switch LS–2, thus breaking the circuit to motor 135 for spacer 98, which prevents the spacer 98 being raised to allow further packages to feed into position, even though the first packages are disengaged from limit switches LS–1, LS–3 and LS–4. Simultaneously, contact 2a of limit switch LS–2 energizes control relay CR–1 and contact 1b thereof prevents release of contact 4a of limit switch LS–4, thus preventing the establishment of a secondary circuit to spacer 98. Contact 4a of limit switch LS–4 maintains the control relay CR–1 energized through contact 1a thereof. When fluid motor 142 returns the pusher 8 to its initial position, contact 2b of limit switch LS–2 is re-set, indicating a clear path for additional packages to enter the machine.

Following the first cycle of operation, control relay CR–1 is picked up, whereupon a slightly different mode of operation prevails. In this condition, the first package tripping contact 1a of limit switch LS–1 does not lower the spacer 98 because contact 1c of control relay CR–1 maintains a circuit around the switch. The contact 1b of limit switch LS–1 sets up an additional circuit for holding relay switch CR–1 energized so that as the package continues its movement opening contact 4a of limit switch LS–4, the relay switch CR–1 is held in position through contact 1b of limit switch LS–1. Further movement of the package releases limit switch LS–1 and with contact 1b thereof released and contact 4a of limit switch LS–4 open, relay switch CR–1 drops out, thus permitting contact 1a of limit switch LS–1 to regain control of the operation of motor 135 for spacer 98. The succeeding package follows a short distance behind the first package by reason of the different speeds of the conveyors and trips contact 1a of limit switch LS–1 causing the spacer 98 to be lowered, thus preventing further flow of packages. This action permits both packages to be moved into the machine more rapidly and prevents multiple operations of the spacer. The conveyor 3 continues to operate in this manner until the machine is stopped.

Fluid motor 142 for pusher 8 will not necessarily load packages onto the apron 74, as described above, until certain other conditions have been met. In order to avoid interference of the various packages when they are pushed onto the apron 74, they must be loaded in a definite sequence. This sequence requires that fluid motor 144 for pusher 6 adjacent conveyor portion 125 complete its operation before fluid motor 142 for pusher 8 can make its last stroke. In the event a seven package pattern is being employed, it would mean that fluid motor 144 would make three cycles of operation before fluid motor 142 could make its last operation. Fluid motor 142 may make all but the very last operation without regard to the position of fluid motor 144.

Again using a seven package pattern for illustration, fluid motor 142 for pusher 8 would make its first operation whenever it has the correct number of packages located in front of the apron and would be prevented from making its second and last pass until the fluid motor 144 for pusher 6 had completed its three operations.

The foregoing description also applies to an eight package pattern, except that fluid motor 142 is only required to make one operation in order to construct the pattern. Consequently, the first pass of this fluid motor is the last or final operation and, therefore, it cannot operate until fluid motor 144 has loaded the packages placed before pusher 6 onto apron 74. Package patterns for other than seven or eight are formed in a similar manner with the same requirement that fluid motor 142 make all but the final pass at any given time, but the final stroke must await completion of loading operations by fluid motor 144.

Fluid motor 142 is restrained from making its final operation by stepping relay SR–1. In the seven package pattern, the contacts 1 and 1a of SR–1 are selected by means of contact 4a on control relay CR–4. This circuit will be closed during the first operation of the fluid motor 142. During the first operation thereof, the fluid motor 142 actuates contact 5b of limit switch LS–5 and energizes stepping relay SR–1, causing it to make a count and to open the loading circuit for fluid motor 142. The last and final pass or operation of the fluid motor 142 cannot be started through stepping relay SR–1. As fluid motor 144 completes its operation, a circuit is established through stepping relay SR–2–3a and control relay CR–3 so that the open contacts of stepping relay SR–1 (SR–1–1a) are by-passed. This condition allows fluid motor 142 to load the packages positioned ahead of pusher 8 onto the apron 74.

For an eight package pattern, where no preliminary loading is permitted, contact 4Ad of control relay CR–4 is arranged so that fluid motor 142 will not be energized at any time through stepping relay SR–1, but must await completion of the circuit through SR–2–3a and contact 3d of control relay CR–3.

The final operation of fluid motor 142 is employed to restrain the packages placed on apron 74 so that they do not become displaced when the apron is withdrawn from under the packages. To accomplish this the fluid motor is not returned, and the pusher 8 connected thereto which engages the packages, functions as a guide for the layer of packages deposited on the apron. However, during all passes except the final pass, provision must be made for returning the fluid motor to its normal position. This is done by permitting the fluid motor to engage contact 10b of limit switch LS–10 at the outer end of the stroke of the fluid motor, which action energizes the return circuit for the fluid motor 142 and causes it to return to its normal position. During the final pass of fluid motor 142, it cannot make a complete stroke by reason of the presence of packages on the apron and, therefore, cannot actuate contact 10b of limit switch LS–10. Therefore, no return signal is provided and the fluid motor 142 and its attached pusher 8 remain in extended position, holding this position until after the apron has been withdrawn, thus permitting the packages to drop onto the pallet 4. The selection of the proper contacts on relay SR–1 is made by control relays CR–4 and CR–4a, these relays in turn being activated by the package selector switch 249.

The operation of conveyor 2 differs from that of conveyor 3 in several respects. In order to establish a seven package pattern, only one package is permitted to enter the machine at this time, whereas for an eight package pattern two packages are required. Therefore, this conveyor may operate in either of two modes. For the seven package pattern the control relay CR–4 is energized, control relay CR–4A deenergized, and control relay CR–3 is energized. The motor 135' for spacer 122 is energized by means of contact 8b of limit switch LS–8, contact 6a of limit switch LS–6, and contact 3a of control relay CR–3. When the first package passes over portion 125 of conveyor 2, it trips contact 6a of limit switch LS–6, thus deenergizing motor 135' for spacer 122 and causing it to lower, halting the flow of packages into the machine. As the package continues its motion it also trips contact 9a of limit switch LS–9 which releases control relay CR–3, thus preventing spacer 122 from rising even though the package passes over limit switch LS–6. When the package strikes contact 7b of limit switch LS–7, indicating its presence in the loading zone, fluid motor 144 for pusher 6 is energized and this package is loaded onto the apron 74. When the fluid motor 144 leaves its normal position, contact 8a of limit switch LS–8 is released, thus re-setting control relay CR–3 and preventing the spacer 122 from rising even though all of the switches on this conveyor line are released by removal of the package, the operation thereof being similar to that of conveyor 3 when the fluid motor therefor leaves its normal position. The contact 3c of control relay CR–3 maintains the same energization through contact 9a of limit switch LS–9, after the circuit through contact 8a of limit switch LS–8 is broken. Simultaneously, when the fluid motor 144 for pusher 6 is energized, stepping relay SR–2 is also energized and its contacts establish the circuit for the return stroke of the fluid motor. During the first and second operations of the fluid motor, SR–2–3b remains closed so that when the fluid motor releases contact 25a of limit switch LS–25, a signal is provided for restoring the fluid motor to its normal position. This signal limits the stroke of the fluid motor to a length which will cause it to just clear the conveyor for the following package. A substantial saving in loading time is thereby realized.

During the third pass or operation of the motor, SR–2–3b opens and contact 25a of limit switch LS–25 is opened. Therefore, fluid motor 144 is not returned and will complete its operation to place the three packages in their intended location on the apron 74. During the final operation of the fluid motor, the contacts SR–2–3a are closed so that when the control relay CR–3 is energized, as the pusher 6 leaves its normal position, contact 3d of control relay CR–3 completes the circuit for allowing the other fluid motor 142 for pusher 8 to begin its final operation, as previously described.

When the machine is at rest, control relay CR–3 will be deenergized and when started, the spacer 122 will be permanently blocked in its lowered position, thus preventing the entrance of any packages to the machine. This condition is prevented when control relay CR–3 is connected through contact 7a of limit switch LS–7 to the auxiliary contacts of the run switch 242. Therefore, when the machine is started, this relay will be automatically energized and the spacer 122 will rise unless a package is on the conveyor portion 125. When a package is in position on the conveyor, it will open contact 7a of limit switch LS–7, thereby disabling the auxiliary contacts on run switch 242 and maintaining control relay CR–3 deenergized, this being the normal condition of operation when one package is in position on the portion 125 of conveyor 2. The normal operation of fluid motor 144 for pusher 6 will then energize control relay CR–3 upon release of contact 8a of limit switch LS–8.

For an eight package pattern, the control relay CR–4 is deenergized, control relay CR–4A energized, and control relay CR–3 is energized. The circuit for the motor 135' for spacer 122 is energized through contact 8b of limit switch LS–8, contact 6a of limit switch LS–6, and contact 3b of control relay CR–3 all of which are in parallel, since contact 4a of control relay CR–4A is closed and contact 4b of control relay CR–4A and contact 3a of control relay CR–3 are in parallel. A package entering the conveyor passes over contact 6a of limit switch LS–6 and no immediate action is produced thereby because contact 3b of control relay CR–3 maintains a circuit around the switch. However, contact 4c of control relay CR–4a is now closed. Also contact 6b of limit switch LS–6 sets up an additional circuit for holding the control relay CR–1 energized and, as the package continues its motion, it opens contact 9a of limit switch LS–9, causing the relay to be held in position through contact 6b of limit switch LS–6. Further movement of the package releases limit switch LS–6 and, with contact 6b of this switch released, and contact 9a of limit switch LS–9 open, relay switch CR–3 is deenergized, allowing contact 6a of limit switch LS–6 to control the operation of spacer 122. Since contact 6a of limit switch LS–6 is released, the spacer will remain in its elevated position. The second package follows a short distance behind the package already on the conveyor portion 125 by reason of the different speeds of the conveyors, and this following package trips contact 6a of limit switch LS–6, causing the spacer 122 to be lowered and preventing further flow of packages over the conveyor. When two packages are in position to be loaded onto the apron, as evidenced by the closing of contact 7b of limit switch LS–7 and contact 9b of limit switch LS–9 activated by the now open contact 4b of relay CR–4b, fluid motor 144 loads the packages onto the apron. When fluid motor 144 leaves its normal position, contact 8b of limit switch LS–8 is released, thus preventing packages from entering the machine and simultaneously setting control relay CR–3. Contact 25b of limit switch LS–25 then utilizes the fluid motor 144 for the first and second operations, just as in the seven package pattern, and the final operation will load six packages on the apron.

Since control relay CR–3 is energized by the run switch 242, no preliminary cycling is necessary and the first and second packages will enter the machine in the normal manner rather than being admitted separately during two operations of the spacer 122. The presence of a single package on the feeder will again prevent control relay CR–3 from being energized by the run switch 242, but in an eight package pattern this will not affect the rising of the spacer because relay switch CR–4A(b) by-passes the contact 3a of control relay CR–3.

While stepping relay SR–2 is energized by the same circuit that initiates the loading operation of fluid motor 144, a definite signal must be provided so that the relay does not establish multiple counts. Normally, the rapid motion of the packages passing over conveyor 2 may cause the various switches to flutter and create faulty operation of the stepping relay. Consequently, as soon as the circuit for fluid motor 144 is even momentarily affected, control relay CR-9 is energized. Control relay CR-9, in effect, seals itself in closed position by contact 9a of CR-9 connected through contact 25b of limit switch LS-25. This relay, as well as the stepping relay SR-2, remains energized regardless of any faulty action or flutter of the switches, until fluid motor 144 has activated contact 25a of limit switch LS-25 to thus break the circuit to relay CR-9.

The additional interlocking between limit switches LS-1, LS-3 and LS-4, required for conveyor 3, is unnecessary for the corresponding limit switches LS-6, LS-7 and LS-9 on conveyor 2. This is because the physical length of conveyor 2 is less than that of conveyor 3 so that the second package will not over-ride limit switch LS-6. Consequently, this switch alone is sufficient for preventing spacer 122 being elevated after two packages are in position on the conveyor.

When fluid motor 142 has completed its last operation, the apron 74 should be completely loaded since fluid motor 144 has completed its number of operations prior to the final operation of fluid motor 142. As this fluid motor 142 actuates contact 5b of limit switch LS-5 for the final count, a circuit is established through either SR-1-1b and CR-4A(d) or SR-1-2b and CR-4a, depending upon whether an eight or a seven package pattern is being employed. This circuit is also used to initiate two operations, the first operation being that fluid motor 142 should continue its operation until the pusher 8 contacts the packages while they are on the apron and should hold this position until the apron is withdrawn. In order to secure this result without employing excessive force on the packages, the dump valve 258 (Fig. 65) is opened to relieve all air pressure on fluid motors 142 and 144. This places both motors in position for preventing displacement of the packages without applying force thereto so that they may freely fall from the apron onto the pallet. The second operation is that the valve which controls the operation of the apron 74 is energized so that the apron will be withdrawn from under the packages in order to deposit them on the pallet 4. As soon as the solenoid for this valve is energized, the auxiliary switch therefor is closed so as to maintain a continuous circuit for the valve. The closing of the auxiliary switch is necessary since the initiating signal for the operation of this valve is of short duration and is lost as soon as the apron 74 clears contact 11b of limit switch LS-11.

The contacts SR-1-1b and SR-1-2b are used to determine when the above operations will take place, but they are too small to actually close the circuit to the solenoid valves. Consequently, an auxiliary contact SR-1-X is utilized for making the final closure. This contact is completed when SR-1 is released as fluid motor 142 passes contact 5b of limit switch LS-5. Since this contact is located slightly ahead of the stopping point for the fluid motor 144, the dump valve 258 and the valves controlling the apron 74 are energized before the last packages are completely on the apron. However, the fluid motor 142 will coast the remaining distance for properly locating the packages in correct position on the apron. When the apron begins to move from under the packages arranged thereon, contact 11b of limit switch LS-11 is released and this breaks the circuit to the fluid motors 142 and 144, thus preventing any packages being pushed into the opening left by the removal of apron 74.

The apron continues to withdraw until contact 12a of limit switch LS-12 is actuated, which breaks the circuit to the solenoid-operated valve controlling the operation of the fluid motor 97 which actuates the apron. Contact 12b of limit switch LS-12 energizes control relay CR-8 and closes the dump valve 258 so that pressure is again directed to one of the two motors. Contacts 8a and 8b of control relay CR-8 then energizes the return circuit so that fluid motors 142 and 144 are permitted to return pushers 8 and 6, respectively, to their normal positions.

As the apron moves from under the packages they drop onto the pallet 4 which is placed in position by the hoist 46. In so doing the packages interrupt the light beam reflected by the mirror 236 from the light source 237 to photoelectric cell 235. This partially completes the circuit for the valve that controls the downward movement of the hoist 46. The circuit is completed for this valve when the apron 74 completely clears the packages and engages contact 12b of limit switch LS-12, thus closing the circuit to contact 8c of control relay CR-8 and allowing the hoist 46 to descend until the lowering valve is deenergized by the unblocking of the light beam. The restoring of the light beam closes another set of contacts in the photoelectric cell, causing apron 74 to return, which action resets stepping relays SR-1 and SR-2. These same contacts energize motor 64 and cause the table 45, which supports the pallet 4, to revolve in a direction determined by limit switches LS-13 and LS-14. The signal of the photoelectric cell 235 is of short duration because as soon as the apron starts its return movement, it releases contact 12b of limit switch LS-12 and deenergizes control relay CR-8. Consequently, the auxiliary switch in the valve controlling the return movement of the apron 74, is closed as soon as its solenoid is energized for providing a closed or "seal-in" circuit for holding the valve in its open position. This circuit is maintained until the apron 74 has completed its return movement and actuated contact 11a of limit switch LS-11.

The table 45, which supports the pallet 4, is normally in contact with one of the limit switches LS-13 or LS-14, depending upon the direction the table is to turn for the next impulse. Assuming that it engages contact 13a of limit switch LS-13, the switch would then be open and contact 14a of limit switch LS-14 would be closed. When the impulse from the photoelectric cell 235 is received, it energizes the counter-clockwise starter coil (not shown) through contact 14a of limit switch LS-14 and the interlocking contacts of the starter. As soon as the motor starts, the table 45, which supports the pallet 4, begins to revolve and releases contact 13a of limit switch LS-13 so that the timer switch TR-1, connected to limit switches LS-13 and LS-14, is energized. The clockwise starter coil (not shown) cannot be energized because it is now locked out by the interlocking contacts of the starter. As soon as the timer switch TR-1 is energized, contact 1a of this switch seals a circuit around the photoelectric cell 235, thus providing a continuous circuit therefor even though the movement of the apron 74 interrupts the circuit from the photoelectric cell. When the turntable 45 completes 180° of rotation, it will contact limit switch LS-14 which deenergizes the counter-clockwise coil in the starter and allows the clockwise coil thereof to be energized since limit switch LS-13 is now closed. This plugs the motor circuit for bringing it to a quick stop. The duration of this plugging is determined by timer switch TR-1 which releases after it has been deenergized in approximately a half second so that the clockwise coil in the starter may be energized for a short period of time, or sufficient to bring the motor 64 to rest. The table 45, which supports the pallet 4, is now in position to receive another impulse from the photoelectric cell 235 to revolve the table 180° in the opposite direction.

As the table 45 revolves, the apron 74 is being returned to its normal position, energizing contact 11b of limit switch LS-11 and permitting the motors 142 and 144 to become operative. Packages have run into the machine on the conveyors so that there are now two packages ahead of fluid motor 142. Also, one or two packages, depending upon the pattern selected, will be located in front of fluid motor 144. As soon as the apron 74 has completed its return motion, a new loading cycle is set in motion.

During the time the table 45 supporting pallet 4 is revolving, additional contacts TT (Fig. 65) on the starter prevent movement of the hoist 46 in either direction. However, upon the completion of the turning cycle, the table 45 is then positioned to rise until the light beam to the photoelectric cell 235 is interrupted, as indicated by the opening of contacts in the photoelectric amplifier. The table is elevated by the closing of SR–2–X which is an auxiliary contact thereof. This contact is closed each time the relay is set, which occurs each time the fluid motor 144 makes a loading stroke. Consequently, upon the flow of packages into the machine, the hoist 46 may rise on either the first, second or third stroke of fluid motor 144, generally on the third stroke. As soon as the valve which controls the upward motion of the hoist 46 is energized, it is locked in position through an auxiliary switch located in the solenoid for the valve so that the hoist will continue to rise regardless of the length of time SR–2–X remains closed. The light beam is adjusted so that the hoist first descends to a point several inches below the apron 74 and then returns to a position a fraction of an inch beneath it. This mode of operation permits maximum clearance between the apron 74 and the packages while the table 45 is revolving and a minimum descent for the next tier. This process is repeated until a given number of tiers or layers of packages has been arranged on the pallet, which number is selected by switches 245 selecting one of the height controlling limit switches LS–21, LS–22 and LS–23 through control relays CR–6 and CR–7. When switch height #3 of switches 245 is actuated, both control relays CR–6 and CR–7 are deenergized and contacts 6b and 7b of these control relays select limit switch LS–23 as the height determining switch. Contacts 6d and 7d of control relays CR–6 and CR–7, respectively, energize a suitable pilot light on the control panel. If switch height #2 of height switches 245 is closed, the control relay CR–7 is energized, thus providing a sealing or holding circuit through the normally closed contacts of switch height #1 of switches 245 and contact 7c of control relay CR–7. Contact 7a of control relay CR–7 selects limit switch LS–22 as the height determining switch and the pilot light therefor is energized by being connected in parallel with control relay CR–7. Switch height #1 of switches 245 releases control relay CR–7 and energizes control relay CR–6 which similarly provides a sealing or locking circuit through contact 6c of control relay CR–6 and the normally closed contact of switch height #2 of switches 245. Contact 6a of control relay CR–6 selects limit switch LS–21, its pilot light being energized by the connection across control relay CR–6.

Limit switches LS–21, LS–22 and LS–23 are set to indicate the desired height of the stacking of packages on the pallet and are actuated by the particular position of the hoist 46. Assuming switch height #1 of switches 245 is closed when sufficient tiers of packages have been deposited on the pallet to satisfy the requirements of this particular height switch, limit switch LS–21 will be actuated and control relay CR–5 will be energized, thus causing the hoist 46 to lower completely through contact 5d of control relay CR–5. Contact 5c of control relay CR5 prevents the table 45 being returned so that on application of the last layer of packages on the pallet, the table will pass to its lowermost position. Contact 5a of control relay CR–5 breaks the circuit to the part of the valve which controls the outward motion of the apron 74, thereby preventing its being withdrawn while the hoist 46 is being lowered and unloaded. Consequently, packages will be loaded onto the apron until the required pattern has been formed. The machine will not operate until the hoist 46 raises an empty pallet 4 into suitable loading position. Contact 5f of control relay CR–5 disables the circuit from SR–2–X that would normally attempt to raise the hoist 46 to a position under the apron 74. Control relay CR–5 may be energized by closing switch 241 for rejecting the pallet 4 and the load thereon from the machine. This switch 241 may be closed at any time and since it is connected through contact 11a of limit switch LS–11, control relay CR–5 may only be energized when the apron 74 has been returned to its closed or normal position and not during any movement thereof. If this switch is depressed during the time the pallet 4 and the table 45 are turning, contact TT on the starter for the table motor 64 prevents the valve controlling the lowering motion of the hoist 46 from being actuated until the pallet and the table supporting the same have completed their turning motion. Control relay CR–5 remains closed until it is released by contact 15b of limit switch LS–15 which is actuated when the hoist 46 returns to its uppermost position.

As soon as the hoist 46 begins its lowering motion, it continues until it actuates contact 16a of limit switch LS–16 which breaks the circuit to the portion of the valve controlling the lowering motion of the hoist. If the limit switch LS–17 is released, indicating that there is a clear area available for the loaded pallet, contact 16b of limit switch LS–16 energizes the chain motor 34 for discharging the loaded pallet and bringing an empty pallet into position. The starter for this motor is then sealed or locked around limit switch LS–17 so that passage of the pallet over this switch will not interrupt the discharging operation. As the loaded pallet is being removed from the machine, the stops 67 (Figs. 14 and 35) assume a position so that an empty pallet 4 is correctly positioned on the table 45 carried by the hoist 46. These stops 67 actuate the respective contacts 18b and 24b of limit switch LS–18 and LS–24 so that when an empty pallet is in position against the stops, the hoist will start an upward motion and the lifter 15 in the pallet magazine will also begin to rise. The chain motor 34 is disconnected when the hoist clears contact 16b of limit switch LS–16 and the hoist will continue its upward motion until it actuates contact 15a of limit switch LS–15, thereby deenergizing the solenoid which controls the upward motion of the hoist and deenergizing control relay CR–5 through contact 15b of limit switch LS–15. Limit switch LS–24 is employed with limit switch LS–18 so that as the hoist rises, limit switch LS–24 will be released and only a momentary signal will be applied to the air valve controlling the fluid motor in the pallet magazine. This prevents loss of pressure fluid by continuous energization of the valve.

The pallet lifter 15 in the magazine continues its motion to the uppermost position thereof and when it contacts pallet 4, limit switch LS–20 is actuated. This upward motion continues to a predetermined position, whereupon a cam-actuated valve causes the arms 18 to be opened. The opening of these arms 18 momentarily trips LS–19 which, with LS–20(b), causes the table 15 to descend. As the table 15 descends, it reverses the cam valve which will adjust the arms 18 to hold all of the pallets except the lowermost one which will be loaded onto the conveyor chains 33. The empty pallet is now in position for the next cycle of operation.

Assuming that the pallet magazine is empty when the lifter therein starts to rise, limit switch LS–20 will remain open and the pallet support 15 will rise to its uppermost position and remain in that position. As soon as the pallets are loaded into the magazine, contact 20b of limit switch LS–20 will be actuated, but the fluid motor 12 will remain in its upward position because contact 19b of limit switch LS–19 is only momentarily closed. This permits the truck operator to remove the forks thereon from the stack of pallets and to depress the starting switch in parallel with contact 19b of limit switch LS–19 so that the pallets will begin to feed in the normal manner. The only time limit switch LS-20 is actuated is when the fluid motor in the pallet magazine is in operation which indicates this action by energizing a suitable signal light. As soon as the support 15 for the pallets in the magazine contacts the stack of pallets therein during its upward stroke, the signal light will be extinguished, which indicates that no more pallets should be loaded into the pallet magazine. As the support for the pallets begins its downward motion, it releases limit switch LS-20 as soon as the lowermost pallet 4 rests on chains 33, thus energizing the signal light, indicating that additional pallets may again be loaded into the machine.

The conveyor feed control is connected to the return circuit of both conveyor spacers 98 and 122 so that when the switch is in its "off" position, neither of the spacers can be lifted, thus preventing the entry of packages into the machine. An additional circuit is established by auxiliary contacts of this switch so that the clear switch may be placed in condition for operation. This clear switch is only effective when the feed is in the "off" position, and then control relay CR-2 will be energized. Contact 2a of this control relay CR-2 closes the circuit through the auxiliary switch for the upward motion of the hoist so that the relay will remain closed until the hoist starts its upward motion with the next empty pallet. Contact 2b of control relay CR-2 energizes the part of the valve which controls the withdrawal motion of the apron 74 regardless of the number of packages thereon, thus permitting a partial layer of packages to be deposited on the pallet. Contact 2c of control relay CR-2 acts as an additional safeguard for preventing either of the fluid motors for pushers 6 and 8 from loading packages on the apron. When the apron clears the pallet, the actuating contact 12b of limit switch LS-12 closes contact 8c of control relay CR-8 and a circuit is established through contact 2d of control relay CR-2, thus energizing control relay CR-5 in order that the partially loaded pallet may be lowered and discharged from the machine in the normal manner. As soon as an empty pallet 4 assumes its position, the machine will again operate normally.

When the manual or automatic electric switch is set to the manual position, power is removed from all control circuits and the only equipment remaining operative are the photoelectric cell amplifier and the fluid pumps. However, an auxiliary or emergency circuit is provided for the "in" and "out" movement of the apron and the "down" movement of the hoist. When any of these switches are closed, the normal operating circuit is disconnected and emergency power is applied to the valve selected so that short movements of these devices may be obtained to release jammed packages or for other reasons.

*Loading pattern selection*

The package selector switch functions to correctly position the various size packages upon the pallet and also to select the desired pattern. It may be shifted to a new pattern at any time but will not become effective until the pallet then being loaded is lowered and discharged. Until then, relay CR-5 is deenergized and contact 5b of this relay is open, thereby disabling the selector switch. When contact 5b of relay CR-5 closes, power will be directed to position switch A (Fig. 65a) so as to move dam 5 (Fig. 51) to its desired location. The package selector switch includes four position switch assemblies (Fig. 65a), each of which consists of six miniature snap switches that are actuated by a cam connected directly to the associated dam. As this dam is moved by its hydraulic cylinder, the cam is carried across the snap switches so that one switch will be operated for each desired position of the dam.

Assuming the package selector is set on position #1 and contact 5b of relay CR-5 is closed, a circuit will be made in the pole of snap switch #1 in position switch A. These circuits are shown in Fig. 65a. If dam 5 is not located correctly, this snap switch is released and the circuit is continued to the forward solenoid in the hydraulic valve controlling this dam. The hydraulic cylinder 158, dam 5, and position switch cam 176' (Figs. 56 and 57) will all move forward until snap switch #1 is actuated, at which time the control valve will be deenergized and the entire assembly will stop. If snap switch #1 is located so that the dam must be withdrawn, the operating cylinder will move out to the end of its stroke where a second cam in position switch assembly will actuate a reversing switch. The circuit from the package selector switch is then transferred to the reverse coil of the controlling valve and the dam assembly will withdraw to the desired position.

When dam 5 is finally in position, snap switch #1 will be thrown so that the circuit from the package selector switch will be carried through position switch A to snap switch #1 in position switch B. Dam 7, or one portion thereof shown in Fig. 54, will then be located in the same manner as described above. Position switch C will be energized, the other portion of dam 7 will set, and position switch D will be activated. At this time pilot light #1 will also be energized to indicate that the machine is set for the desired package. Dam 3' is then located to complete the cycle. During the time dam 3' is moving, most of the snap switches in position switch D are released. Consequently, the various pilot lights may all be connected together. However, as soon as the cam is correctly positioned and snap switch #1 is made, all but the one desired light will go out. After dam 3' is correctly located, all four snap switches corresponding to position #1 of the package selector switch are actuated, indicating that all dams are in position. The circuit thus established will energize the pattern selecting relays CR-4 and CR-4A so that the pushers and spacers will operate to form a seven package pattern as previously described. When relay CR-4 is energized, contact 4c of relay CR-4 continues the circuit from the package selector switch to one of the main supply lines. This main line, in turn, supplies power to the pushers 6 and 8, spacers 98 and 122, and to the release coil of relay CR-5 so that if it is deenergized, none of the above mentioned components may function. This arrangement is designed to prevent any packages entering the machine while it is undergoing a pattern change.

Let it be assumed that a loaded pallet is being discharged and relay CR-5 energized, thereby closing its contact 5b. It has been previously explained that relay CR-5 would normally be released when the hoist 46 returns to its uppermost position and engages contact 15b of limit switch LS-15. However, contact 15b of limit switch LS-15 is connected to the main supply line so that if the machine is being changed from one package to another, relay CR-5 will not be released until the change has been completed. This is true since contact 5b of relay CR-5 might disable the dams before they are completely set, and the main supply line is energized through the package selector switch. At this point relay CR-5 will be dropped out and its contact 5c will by-pass the package selector switch, dams, and the like. Consequently, if, during the loading of a pallet 4 one of the dams becomes jarred loose from its associated snap switch, it will not disrupt the normal operation of the machine. However, the pilot light may go out under these conditions but this is normal and will have no effect upon the rest of the machine. Furthermore, when the next pallet is discharged from the machine, contact 5b of relay CR-5 will close and the dams will readjust themselves to account for any oil leakage, slippage, and the like.

If the package selector switch is moved to a new position before the loaded pallet is discharged, no action will occur since contact 5b of relay CR-5 is open. The pilot light will remain on through contact 5c of the relay CR-5, contact 4c of relay CR-4, and snap switch #1 in position switch D. However, as soon as relay CR-5 is energized (when the pallet is discharged) the light will go out since contact 5c of relay CR-5 is open, and the dams will begin to reset as described above. If the package pattern selected calls for an eight pattern arrangement, relays CR-4 and CR-4A will be reversed and CR-4 (d) will serve to energize the main line referred to above.

The present machine is arranged to automatically stack packages in a predetermined pattern upon a given pallet for a selected number of layers. The machine consists of three basic components as follows: First, a pallet magazine capable of holding a supply of empty pallets and providing for their individual release into the loading area; secondly, an apron conveyor and its associated feeder conveyors to assemble the packages in the required pattern. This apron conveyor is used as an intermediate loading area until an entire layer is completed, at which time it is withdrawn to deposit the packages onto the pallet located directly beneath it; finally, an elevating mechanism for supporting the pallet as it is being loaded, and to progressively lower the load as additional layers of packages are placed thereon.

The machine receives packages from two conveyor feeders arranged at right angles to each other so that packages may be positioned upon the pallet either lengthwise or widthwise, as determined by the patern. By selecting both the number and location of the packages coming from each feeder, various patterns may be assembled. After each layer, the pallet and load are rotated 180° so that each succeeding layer is interlocked with the one preceding it. Since this operation is performed after the pattern has been assembled upon the apron conveyor, no variation in the loading sequence is necessary and a completely repetitive cycle is maintained. When the pallet has been loaded to the predetermined number of layers, it is automatically ejected from the machine and a new pallet obtained from the pallet magazine, is brought into place to repeat the loading cycle.

What we claim is:

1. A pallet loading machine comprising an apron, a pallet support disposed below said apron, conveyors disposed on right angularly related sides of said apron, means for spacing and counting packages passing over said conveyors, dams at the ends of each conveyor for arresting the motion of packages thereon, means for aligning the dam with the pallet, means for moving the counted and spaced packages onto said apron in a predetermined sequence, other dams are aligning the packages with said pallet, fluid motors for adjusting the position of said dams; and means for controlling the actuation of said fluid motors.

2. A pallet loading machine comprising an apron, a pallet and support therefor disposed beneath said apron, conveyors disposed on right angularly related sides of said apron, counting and spacing means for packages passing over said conveyors, dams for arresting the movement of packages over the conveyors and for aligning the packages with the pallet, fluid operated pusher means for pushing the spaced and counted packages onto said apron, means for controlling the cyclic operation of said fluid motors, other dams disposed opposite each of said fluid motors for aligning the packages with said pallet, a fluid motor for adjusting the position of each dam; and means for controlling the operation of each dam motor so that the dams will be aligned with said pallet.

3. A pallet loading machine comprising an apron, a pallet support having a pallet thereon disposed below said apron, conveyors disposed on right angularly related sides of said apron, counting and spacing mechanism for packages passing over each conveyor and associated therewith, a dam for each conveyor for arresting the motion of spaced and counted packages, a fluid motor operated pusher for each conveyor for moving spaced and counted packages onto the apron, dams located opposite each pusher, fluid actuated motors for adjusting the position of each dam with respect to said pallet, means for controlling the actuation of each dam adjusting motor, means for controlling the operation of each pusher motor in a predetermined sequence and holding the pusher in engagement with the packages until the packages have been arranged on the apron, means for withdrawing the apron from under packages aligned thereon; means for relieving the pressure in said pusher motor while the packages are dropped onto said apron.

4. In a pallet loading machine comprising an apron, a pallet support having a pallet thereon and disposed beneath said apron, conveyors on right angularly related sides of said apron, counting and spacing means for each conveyor, a dam arranged at the end of each conveyor for arresting the motion of the spaced and counted packages, one of said dams being in alignment with one side of said pallet, fluid motor operated means for each conveyor for moving the spaced and counted packages onto said apron, means for actuating said fluid motion in a predetermined sequence, means for holding each fluid motor operated means in engagement with the packages on the apron after they have moved the required number of packages thereon, means aligning the dam with the pallet, means for actuating the apron to permit the packages thereon to drop onto said pallet; and means for deenergizing said fluid motor during the time packages are dropping onto the pallet.

5. A pallet loading machine comprising a hoist having a support thereon for receiving a pallet, an apron disposed above said pallet, conveyors disposed on right angularly related sides of said apron, counting and spacing means associated with each conveyor, fluid motor operated means for pushing counted and spaced packages onto said conveyor, adjustable dams for arresting the motion of the packages on the conveyors and for aligning the packages with the pallet, means for actuating each fluid motor operated means in a predetermined sequence, means for maintaining said fluid motor operated means in engagement with the packages on said apron after the sequence of operation is performed, means for withdrawing the pallet to permit the packages thereon to drop onto said apron, means for causing said pallet and hoist to descend, means for laterally indexing said support, means for relocating the indexed pallet under said apron, and means for initiating subsequent vertical movement of said hoist after each succeeding layer of packages has been dropped on the pallet.

6. A pallet loading machine comprising a pallet support having a pallet thereon for receiving a plurality of packages, an apron disposed above said pallet support, conveyors on right angularly related sides of said apron over which packages are delivered, spacing and counting means in each of said conveyors, fluid motor actuated means for moving the spaced and counted packages onto said apron, dams for arresting the motion of the packages on the conveyor and for aligning the packages with the pallet, means for adjusting the dam for aligning the dams with the pallet; and means for arresting the operation of said fluid motor actuated means when in engagement with the packages on the apron until the packages have dropped onto said pallet.

7. A pallet loading machine comprising an apron, a pallet support having a pallet thereon disposed below said apron, conveyors disposed on right angularly related sides of said apron, counting and spacing mechanism for packages passing over each conveyor and associated therewith, a dam for each conveyor for arresting the motion of spaced and counted packages, a fluid motor operated pusher for each conveyor for moving spaced and counted packages onto the apron dams located opposite each pusher, fluid actuated motors for adjusting the position of each dam with respect to said pallet, means for controlling the actuation of each dam adjusting motor, means for controlling the operation of each pusher motor in a predetermined sequence and holding the pusher in engagement with the packages until the packages have been arranged on the apron, means for withdrawing the apron from under packages aligned thereon, means for relieving the pressure in said pusher motor while the packages are dropping onto said pallet; and means for initiating movement in said pusher motors to restore them to their original position.

8. In a pallet loading machine comprising an apron, a pallet support having a pallet thereon and disposed beneath said apron, conveyors on right angularly related sides of said apron, counting and spacing means for each conveyor, a dam arranged at the end of each conveyor for arresting the motion of the spaced and counted packages, one of said dams being in alignment with one side of said pallet, fluid motor operated means for each conveyor for moving the spaced and counted packages onto said apron, means for actuating said fluid motion in a predetermined sequence, means for holding each fluid motor operated means in engagement with the packages on the apron after they have moved the required number of packages thereon, means aligning the dam with the pallet, means for actuating the apron to permit the packages thereon to drop onto said pallet, means for de-energizing said fluid motor during the time packages are dropping onto the pallet; and means for re-energizing said fluid motors to restore them to initial position for permitting the fluid motors to start a succeeding operating cycle.

9. A pallet loading machine comprising a pallet supporting member movable between initial pallet load receiving and loaded pallet discharge positions, packages delivering conveyor means laterally adjacent the initial pallet load receiving position of said supporting member, control means adapted to operate the package delivery cycle of said conveyor means to select a pattern of packages to be loaded on a pallet, control means adapted to move said pallet supporting member between said positions to effect the loading of layers of packages, and adjustable mechanism adjacent said initial pallet load receiving position to assume adjusted positions about the sides thereof for aligning and compacting packages on pallets on said pallet supporting member, said adjustable mechanism including means adapted to shift the position thereof in acccordance with the pattern of packages selected at said control means.

10. A pallet loading machine comprising elevator means for supporting a pallet, means for locating a pallet on said elevator means, an apron movable into and out of a position adapted to receive packages to be loaded on a pallet in layers, said elevator means initially locating the pallet beneath said apron package receiving position, package conveyor means located laterally adjacent said apron package receiving position, counting and spacing means in said conveyor means actuated by packages delivered over said conveyor means, pusher means operable to move the counted and spaced packages onto said apron, controllable motor operated dams adjustably mounted laterally adjacent said apron package receiving position to respond to pre-selected patterns of packages to be loaded and align the packages with a pallet supported on said elevator means, said adjustable dams and pusher means cooperating to retain the packages assembled in a layer in compact relation during movement of said apron, and means in said machine to index the packages in successive layers to interlock the packages between layers on a loaded pallet.

11. In a machine adapted to load articles in layers on a pallet, the combination of working parts which includes: a pallet supporting elevator movable from an elevated position in successive descending steps as layers of articles are loaded on a pallet to a lowered position for discharge of the loaded pallet; an apron movable from a position in alignment over a pallet supported on said elevator to deposit a layer of articles thereon; conveyor means leading into the machine adjacent said apron to bring articles thereto for loading on said apron; pusher means adjacent said conveyor means and movable across said conveyor means to push the articles onto said apron; a plurality of control circuits for said combination of working parts in which is included package pattern selector control; and adjustably positionable mechanism adjacent the sides of said apron to respond to said pattern selector control and cooperate with said pusher means to retain the articles in a layer in compact arrangement supported on said apron and during movement of said apron to deposit the layer.

12. In a machine adapted to load articles in layers on a pallet, the combination of working parts which includes: a pallet supporting elevator movable from an elevated position in successive descending steps as layers of articles are loaded on a pallet to a lowered position for discharge of the loaded pallet; an apron movable from a position in alignment over a pallet supported on said elevator to deposit a layer of articles thereon; conveyor means leading into the machine adjacent said apron to bring articles thereto in a predetermined order for loading on said apron in a selected pattern; pusher means adjacent said conveyor means and movable across said conveyor means to push the articles onto said apron to form the layer having the selected pattern; automatic controls for said working parts including package pattern selection control; and adjustably positionable mechanism adjacent said apron to automatically respond to said pattern selection control and cooperate with said pusher means to retain the articles arranged in a predetermined order in a layer in compact arrangement supported on said apron and during movement of said apron to deposit the layer.

13. In a machine adapted to stack articles on a pallet in compact layers, the combination of working parts including: a pallet supporting and elevating means movable in a path having a lowered position to receive empty pallets and discharge loaded pallets and also having elevated positions to receive successive layers of articles; conveyor means conducting articles alongside the path of and toward the uppermost elevated position of said pallet supporting and elevating means; an apron movable into an article receiving position in alignment with and above said pallet supporting and elevating means and adjacent said conveyor means; automatic controls connected to said working parts including article pattern selection control, adjustable mechanism located at the sides of the apron in its article receiving position, said mechanism being adapted to assume positions in accordance with the selected pattern of articles to be stacked; pusher means adjacent said conveyor means to transfer the articles onto said apron, said pusher means and adjustable mechanism cooperating to locate the articles supported on said apron in a compact layer; and means connected with said apron to withdraw it from its article receiving position to deposit the layer of articles on a pallet therebelow, said mechanism and pusher holding the layer in alignment with the pallet.

References Cited in the file of this patent

UNITED STATES PATENTS

| | | |
|---|---|---|
| 1,365,120 | Myers | Jan. 11, 1921 |
| 1,510,717 | Straight | Oct. 7, 1924 |
| 1,551,890 | Luce | Sept. 1, 1925 |
| 1,674,319 | Cranston | June 19, 1928 |
| 2,065,673 | Fay | Dec. 29, 1936 |
| 2,065,674 | Fay | Dec. 29, 1936 |
| 2,216,276 | Mann et al. | Oct. 1, 1940 |
| 2,401,592 | Von Stocker | June 4, 1946 |
| 2,508,861 | Jessen | May 23, 1950 |
| 2,509,467 | Anderson | May 30, 1950 |
| 2,546,501 | Hamilton | Mar. 27, 1951 |
| 2,598,222 | Cahners et al. | May 27, 1952 |
| 2,633,251 | Bruce | Mar. 31, 1953 |
| 2,699,264 | Bruce et al. | Jan. 11, 1955 |
| 2,701,650 | Stevenson | Feb. 8, 1955 |

UNITED STATES PATENT OFFICE

CERTIFICATE OF CORRECTION

Patent No. 2,883,074                                    April 21, 1959

Wilhelm Boehl et al.

It is hereby certified that error appears in the printed specification of the above numbered patent requiring correction and that the said Letters Patent should read as corrected below.

Column 27, line 46, for "are aligning" read -- for aligning --; column 28, line 39, for "pallet" read -- apron --; line 40, for "apron" read -- pallet --.

Signed and sealed this 3rd day of November 1959.

(SEAL)

Attest:
KARL H. AXLINE
Attesting Officer

ROBERT C. WATSON
Commissioner of Patents